(12) United States Patent
Mangino et al.

(10) Patent No.: US 12,217,210 B2
(45) Date of Patent: *Feb. 4, 2025

(54) SYSTEM AND METHOD FOR DATA SELECTION AND EXTRACTION BASED ON HISTORICAL USER BEHAVIOR

(71) Applicant: TBK Bank, SSB, Dallas, TX (US)

(72) Inventors: Michael James Mangino, Cincinnati, OH (US); Michael Davis Niessner, Jacksonville, FL (US); Garrett Stephen Wolfe, Carrollton, TX (US)

(73) Assignee: TBK BANK, SSB, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,799

(22) Filed: Nov. 27, 2023

(65) Prior Publication Data

US 2024/0202651 A1 Jun. 20, 2024

Related U.S. Application Data

(63) Continuation of application No. 18/067,817, filed on Dec. 19, 2022, now Pat. No. 11,829,934.

(51) Int. Cl.
*G06Q 10/0834* (2023.01)
*G06Q 10/083* (2024.01)

(52) U.S. Cl.
CPC ..... *G06Q 10/0834* (2013.01); *G06Q 10/0838* (2013.01)

(58) Field of Classification Search
CPC .............. G06Q 10/0834; G06Q 10/0838
(Continued)

(56) References Cited

U.S. PATENT DOCUMENTS 7,216,292 B1  5/2007  Snapper et al.
8,843,494 B1  9/2014  Sampson
(Continued)

FOREIGN PATENT DOCUMENTS

WO       2021025290 A1    11/2021
WO    WO-2021230054 A1 *  11/2021  ........... G06F 40/258

OTHER PUBLICATIONS

Aste, M., Boninsegna, M., Freno, A. et al. Techniques for dealing with incomplete data: a tutorial and survey. Pattern Anal Applic 18, 1-29 (2015). https://doi.org/10.1007/s10044-014-0411-9 (Year: 2015).*

(Continued)

*Primary Examiner* — George Chen
*Assistant Examiner* — Lisa Ma
(74) *Attorney, Agent, or Firm* — Baker Botts L.L.P.

(57) ABSTRACT

A system determines that a first data element in a first message is linked to a first data field in a first mapped dataset. The system receives a request to determine to which data field in a second mapped dataset a second data element in a second message should be mapped. The system extracts a first set of features from the first message. The system determines that the first data element is located on a first location within the first message. The system extracts a second set of features from the second message. The system determines that the second data element is location on a second location within the second message. The system determines a difference between the first location and the second location. If the difference is less than a threshold distance, the system associates the second data element to the first data element in the second mapped dataset.

20 Claims, 5 Drawing Sheets

(58) Field of Classification Search
USPC .......................................................... 705/334
See application file for complete search history.

(56) References Cited

U.S. PATENT DOCUMENTS

| | | | |
|---|---|---|---|
| 9,824,270 B1 | 11/2017 | Mao | |
| 11,256,659 B1* | 2/2022 | Gu | ................. G06F 16/144 |
| 2008/0119949 A1* | 5/2008 | Gile | ................. G06Q 10/08 |
| | | | 700/28 |
| 2009/0006394 A1* | 1/2009 | Snapp | ................. G06F 16/284 |
| 2013/0304639 A1* | 11/2013 | Acsay | ................. G06Q 30/04 |
| | | | 705/40 |
| 2017/0017922 A1* | 1/2017 | Wicks | ................. G06Q 10/0838 |
| 2019/0034717 A1 | 1/2019 | Kalyuzhny | |
| 2019/0286692 A1 | 9/2019 | Odate et al. | |
| 2020/0058042 A1* | 2/2020 | Kulkarni | ................. G06N 20/00 |
| 2021/0373728 A1 | 12/2021 | Wagle et al. | |
| 2022/0319143 A1 | 10/2022 | Wyle et al. | |
| 2022/0392047 A1 | 12/2022 | Wheaton et al. | |
| 2023/0065915 A1 | 3/2023 | Berestovsky et al. | |
| 2023/0123711 A1 | 4/2023 | De Peuter | |
| 2023/0169054 A1 | 6/2023 | Ghatage et al. | |
| 2023/0214579 A1 | 7/2023 | Somech et al. | |

OTHER PUBLICATIONS

Translation of WO 2021230054 (Year: 2021).*
Mohan, Vijayarani. Template Matching Technique for Searching Words in Document Images. https://www.researchgate.net/publication/329800652_Template_Matching_Technique_for_Searching_Words_in_Document_Images (Year 2015).
Michael J. Mangino, U.S. Appl. No. 18/519,829, "System and Method for Data Selection and Extraction Based on Historical User Behaviour," filed Nov. 27, 2023.
PCT International Search Report and Written Opinion of the International Searching Authority, or the Declaration for International Application No. PCT/US2023/083747, dated Apr. 8, 2024 (Apr. 8, 2024); 15 pages.

* cited by examiner

SYSTEM AND METHOD FOR DATA SELECTION AND EXTRACTION BASED ON HISTORICAL USER BEHAVIOR

PRIORITY

This nonprovisional application is a continuation of patent application Ser. No. 18/067,817 filed Dec. 19, 2022 and entitled "System and method for data selection and extraction based on historical user behavior" hereby incorporated by reference in its entirety.

TECHNICAL FIELD

The present disclosure relates generally to data processing and transformation, and more specifically to a system and method for data selection and extraction based on historical user behavior.

BACKGROUND

Entities in an ecosystem may communicate data to one another via a network. For example, in the freight network ecosystem, the entities associated with the freight network ecosystem may cooperate to facilitate the transportation of a load. In data communication among entities in the freight network ecosystem, some portion of data may be incorrect or incomplete. If not caught, incorrect or incomplete data may impede or otherwise prevent the completion of an operation of a receiving entity.

SUMMARY

The system described in the present disclosure is particularly integrated into a practical application of data correction, transformation, and mapping in data communication among multiple entities. In data communication among entities in any ecosystem, it is important that the communicated data is accurate to avoid mistakes in any operation performed by the entities. For example, with respect to the freight network ecosystem, the message received by an entity from another is evaluated and decisioned manually by operators. This approach suffers from several drawbacks. In one example, this approach suffers from human error. In another example, each of the entities may not have updated information about other entities. Therefore, the message received from an entity may include incorrect, incomplete, and/or stale data (collectively referred to herein as anomalous data) about other entities. This leads to communicated messages being sent to the wrong entities, for example. In another example, an operator associated with an entity may inadvertently include or indicate wrong information about a load (or cargo), a receiving entity, another entity, or other pieces of information related to freight network operations (e.g., movement of the load to a destination) in a message to be sent to another entity. These drawbacks also lead to inconsistency in the data communication, and mistakes in the freight network operations.

These drawbacks cause less-efficient, unreliable, and inaccurate data communication among the entities. These drawbacks, in turn, cause the entities to spend more processing, memory, and network resources to determine the root cause of the inconsistency in the data communication, mistakes in the freight network operations, remedy the root-cause and the mistakes, and complete a transportation of freight. Furthermore, the current technology does not provide a technical solution for anomalous data detection among computer systems associated with different entities.

Data Mapping, Transformation, Correction, and Communication Among Entities Via a Network The disclosed system described herein contemplates systems and methods for data mapping, transformation, correction, and communication among entities via a network. The disclosed system is configured to provide accurate data mapping among the entities. Therefore, for example, even if a first entity refers to a second entity incorrectly in a document/message, the disclosed system is configured to identify the correct identity of the second entity and associate the correct identity of the second entity to the second entity, e.g., so that operations associated with the second entity are performed accurately.

In another example, even if the first entity uses anomalous information about a load (that is to be shipped, is being shipped, or shipped already), another entity, or any other piece of information in data transmission to another entity, the disclosed system is configured to identify respective correct information, associate the correct information to a respective data element in a mapped dataset, and use the correct information for the data transmission. For example, the disclosed system transforms anomalous information into respective correct information by replacing the anomalous information with the respective correct information. In this manner, the disclosed system is integrated into the practical application of data correction, transformation, and mapping, e.g., by transforming the identified anomalous information into the respective correct information.

Furthermore, the disclosed system is configured to reduce the amount of processing, memory, and network resources needed to facilitate a transportation of products, loads, or cargo. For example, by implementing the data correction, transformation, and mapping described herein, inconsistency in the data communication among entities, and mistakes in the freight network operations are minimized or avoided. Therefore, the entities do not have to spend an excessive amount of processing, memory, and network resources in order to determine the root cause of inconsistencies in data communication and mistakes in the freight network operations. Therefore, the disclosed system provides improvements to the transportation technology by reducing the amount of processing, memory, and network resources needed to facilitate the transportation of products.

By implementing the disclosed system in other ecosystems besides the freight network, the data correction, transformation, and mapping can improve the data communication technology. For example, the disclosed system improves the efficiency, reliability, and accuracy of data communication among the entities by implementing the data transformation and correction described herein.

Furthermore, the disclosed system is configured to proactively detect anomalous data in communication among computer systems associated with the entities (before the anomalous reaches a receiving entity), transform the anomalous data into respective correct information, and transmit the respective correct information to a receiving entity. This provides another practical application of proactive anomalous data detection and transforming the identified anomalous data into respective correct information.

In one embodiment, a system for data mapping and transformation comprises a memory operably coupled to a processor. The memory is configured to store a trusted dataset associated with a first freight broker and a first carrier. The trusted dataset associated with the first freight broker comprises at least one of a first name, a first identifying number, a first address, and a first phone number with respect to the first freight broker. The trusted dataset associated with the first carrier comprises at least one of a second name, a second identifying number, a second address, and a second phone number with respect to the first carrier.

The processor is configured to receive load data from a second freight broker. The load data indicates that a load is assigned to a second carrier to be transported from a first location to a second location. The load is associated with a shipper. The second carrier is associated with a factor entity that facilitates keeping records of documents for the second carrier. The processor extracts a first set of data elements from the load data, wherein the first set of data elements comprises indications of at least one of the second freight broker, the factor entity, the shipper, the second carrier, and the load. The processor accesses the trusted dataset.

The processor determines that at least a portion of the first set of data elements is anomalous indicating that the first set of data elements comprises incomplete or incorrect information about the at least one of the second freight broker, the factor entity, the shipper, and the second carrier. The processor transforms at least a portion of the first set of data elements that is determined to be anomalous to correct information retrieved from the trusted dataset. The processor generates a mapped dataset by mapping at least one of the first set of data elements to a respective data element from the trusted dataset, wherein the mapped dataset comprises the at least one of the first set of data elements. The processor determines, based at least in part upon mapping of the at least one of the first set of data elements to the respective data element from the trusted dataset, an identity of at least one of the second freight broker, the factor entity, the shipper, and the second carrier. Based at least in part upon the determined identity of the factor entity, the processor communicates the load data to the factor entity.

The processor receives, from the factor entity, a first message comprising information about a completion of transportation of the load. The processor extracts a second set of data elements from the first message, wherein the second set of data elements comprises the information about the completion of transportation of the load. The processor adds the second set of data elements to the mapped dataset. The processor communicates the first message to the second freight broker. The processor receives, from the second freight broker, a second message comprising a status of the first message, wherein the status of the first message indicates whether the first message is acceptable. The processor extracts a third set of data elements comprising the status of the first message from the second message. The processor adds the third set of data elements to the mapped dataset.

Data Selection and Extraction Based on Historical User Behavior

The disclosed system described herein contemplates systems and methods for data selection and extraction based on historical user behavior. For example, to perform the data mapping, transformation, and correction described above, the disclosed system may implement a data extraction machine learning module to learn from historical data mappings and transformations performed by users. To this end, the data extraction machine learning module may be trained by a training dataset that includes the historical user behaviors and data mappings.

For example, during a training stage, the disclosed system (e.g., via the data extraction machine learning module) may learn that each data element in a first message (e.g., a document, an email, and the like) is linked or mapped to a respective data field in a mapped dataset. In other words, the disclosed system may learn the data mapping performed on the first message to generate the mapped dataset. In this process, the disclosed system may feed the first message to the data extraction machine learning module to extract a set of features, e.g., written text, numbers, and characters on the first message. The disclosed system (e.g., via the data extraction machine learning module) may also determine the location coordinate of each data element in the first message.

During a testing stage, the disclosed system may be given a second message (e.g., a document, an email, and the like) and asked to perform data mapping and generate a mapped dataset. The disclosed system (e.g., the data extraction machine learning module) may feed the second message to the data extraction machine learning module to extract a set of features, e.g., written text, numbers, and characters on the second message. The disclosed system (e.g., via the data extraction machine learning module) may also determine the location coordinate of each data element in the second message.

For example, for mapping a data element in the second message, assume that the disclosed system determines that a first data element in a first message is mapped to a first data field in a first mapped data, and that the first data element is located at a first location coordinate within the first message. Also, assume that the disclosed system determines that a second data element in a second message is located at a second location coordinate in the second message. The disclosed system may compare the first location coordinate to the second location coordinate. If the disclosed system determines that the second data element is located substantially at the same location coordinate as the first data element, the disclosed system determines that the second data element should be mapped to the corresponding first data field in the second mapped dataset. In this manner, the disclosed system improves the data mapping technology, for example, data mapping for documents, files, images, emails, and the like.

In one embodiment, a system for data selection and extraction based on historical user behavior comprises a memory operably coupled to a processor. The memory is configured to store a first message that comprises a first data element, a second message that comprises a second data element, and historical user behavior information that indicates the first data element is mapped to a first data field in a first mapped dataset. The processor determines that the first data element is linked to the first data field based at least in part upon the historical user behavior information. The processor receives a request to determine to which data field in a second mapped dataset the second data element should be mapped. In response to receiving the request, the processor extracts a first set of features from the first message, wherein the first set of features indicates at least one of written text, numbers, or characters at respective location coordinates within the first message. The processor determines that the first data element is located on a first location coordinate within the first message based at least in part upon the first set of features. The processor extracts a second set of features from the second message, wherein the second set of features indicates at least one of written text, numbers, or characters at respective location coordinates within the second message. The processor determines that the second data element is located on a second location coordinate within the second message based at least in part upon the second set of features. The processor compares the first location coordinate with the second location coordinate. The processor determines a distance between the first location coordinate and the second location coordinate. The processor determines that the distance between the first location coordinate and the second location coordinate is less than a threshold distance. In response to determining that the distance between the first location coordinate and the second location coordinate is less than the threshold distance, the processor associates the second data element with the first data field in the second mapped dataset.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect anomalous data and implement data mapping, transformation, and correction in communication among entities. Embodiments of the present disclosure and its advantages may be understood by referring to FIGS. 1 through 5. FIGS. 1 through 5 are used to describe systems and methods for data mapping, transformation, correction, and communication among entities via a network, and systems and methods for data selection and extraction based on historical user behavior.

System Overview

Figure 1:
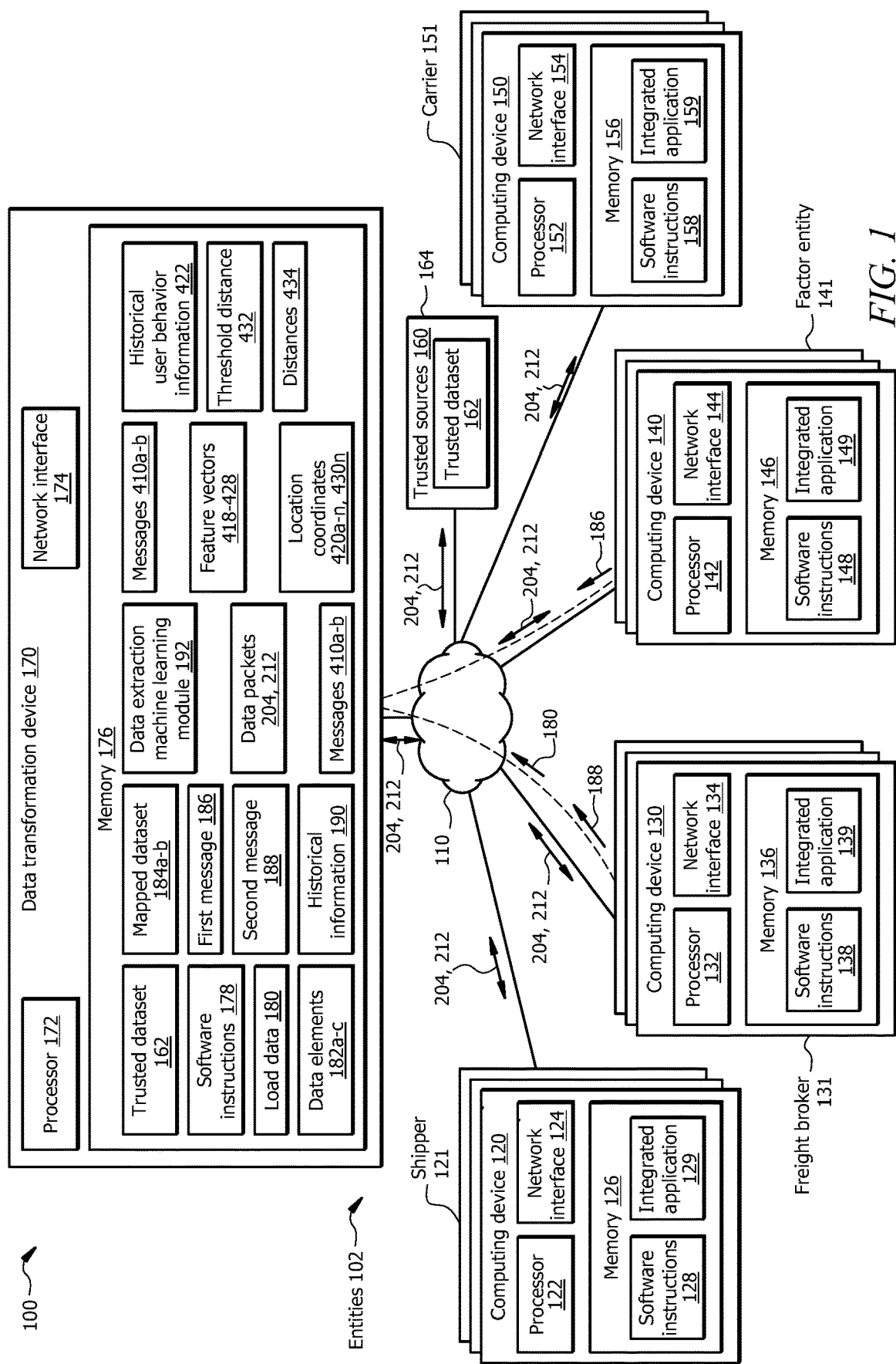
FIG. 1 illustrates an embodiment of a system configured to provide data mapping, transformation, correction, and communication among entities via a network.

FIG. 1 illustrates an embodiment of a system 100 that is configured to provide data mapping, transformation, correction, and communication among entities via a network, e.g., entities 102 associated with a transportation network ecosystem or any other ecosystem. The system 100 is further configured for data selection and extraction based on historical user behavior to perform the data mapping operations described herein. Example operations of the system 100 to provide data mapping, transformation, correction, and communication among entities via a network are described in great detail in FIGS. 2-3. Example operations of the system 100 for data selection and extraction based on historical user behavior are described in great detail in FIGS. 4-5.

In certain embodiments, the system 100 comprises a data transformation device 170 communicatively coupled with one or more trusted sources 160 and one or more entities 102, including shipper(s) 121, freight broker(s) 131, factor entity/entities 141, and carrier(s) 151 via a network 110. Network 110 enables communication among the components of the system 100. In general, the system 100 improves the reliability and authenticity of data communicated among entities 102. For example, the system 100 is configured to proactively detect anomalous data in communication among computer systems associated with the entities (before the anomalous reaches a receiving entity), transform the anomalous data into respective correct information, and transmit the respective correct information to the receiving entity. Therefore, the disclosed system provides a practical application of proactive anomalous data detection and transforming the anomalous data into respective correct information.

In other embodiments, system 100 may not have all of the components listed and/or may have other elements instead of, or in addition to, those listed above.

In the freight network ecosystem, the entities 102 may communicate different information with one another to facilitate a load transportation and delivery. In one potential approach, the entities 102 may communicate files, documents, text, confirmation messages, acknowledgment messages, denial messages, emails, facsimiles, and/or phone calls. In this approach, the data packet 204, 212 received by an entity 102 from another is evaluated and decisioned manually by operators. This approach suffers from several drawbacks. For example, this approach suffers from human error. In another example, each of the entities 102 may not have updated information about other entities 102. Therefore, the data packet 204, 212 received from an entity 102 may include incorrect, incomplete, and/or stale data (collectively referred to herein as anomalous data) about other entities 102. This leads to the data packet 204, 212 being sent to the wrong entities 102. In another example, an operator associated with an entity 102 may inadvertently include or indicate wrong information about a load (or cargo), an entity 102, etc. in a document/file to be sent to another entity 102. This also leads to inconsistency in communication among the entities 102, and mistakes in the freight network operations.

These drawbacks cause less-efficient, unreliable, and inaccurate data communication among the entities 102. These drawbacks, in turn, cause entities 102 to spend more processing, memory, and network resources in order to determine the root cause of the inconsistency in the data communication, remedy the root-cause, and complete the transportation of the load.

The system 100 is configured to provide accurate data mapping among the entities 102. Therefore, for example, even if a first entity 102 refers to a second entity 102 incorrectly in a data packet 204, 212, the system 100 is configured to identify the correct identity of the second entity 102 and associate the correct identity of the second entity 102 to the second entity 102, e.g., so that the data packet 204, 212 is sent to the second entity 102. In the present disclosure, the term "associate" can interchangeably referred to as and/or mean "assign".

In another example, even if the first entity 102 uses anomalous information about a load (that is to be shipped, is being shipped, or shipped already), another entity 102, or any other piece of information in data transmission to another entity 102, the system 100 is configured to identify respective correct information, associate the correct information to a respective data element in a mapped dataset, and use the correct information for the data transmission. For example, the system 100 may transform the anomalous information into respective correct information by replacing the anomalous information with the correct information. In another example, the system 100 may filter anomalous information to be excluded from the data communication to the receiving entity 102. In this manner, the system 100 is integrated into the practical application of data correction, transformation, filtering, and mapping, e.g., by transforming the identified anomalous information into the respective correct information.

Furthermore, the system 100 is configured to reduce the amount of processing, memory, and network resources needed to facilitate a transportation of the load. For example, by implementing the data correction, the entities 102 do not have to spend an excessive amount of processing, memory, and network resources in order to determine the root cause of inconsistencies in data communication, remedy the root-cause, and complete the transportation of the load. Therefore, the system 100 provides improvements to the transportation technology by reducing the amount of processing, memory, and network resources needed to facilitate transportations. The technical solutions of proactive anomalous data detection and correction, and data mapping can be expanded to other ecosystems and technologies besides the freight network ecosystem. Furthermore, the system 100 improves the efficiency, reliability, and accuracy of data communication among the entities 102, for example, by implementing the data transformation and correction described herein.

System Components
Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Shipper

Each shipper 121 may be associated with a computing device 120. The computing device 120 comprises a processor 122 in signal communication with a memory 126. The memory 126 stores software instructions 128 that when executed by the processor 122 cause the computing device 120 to perform one or more operations of the shipper 121 described herein. Shipper 121 may be or include an entity that generally wants to ship or transport goods, products, loads, or cargo (collectively referred to herein as the load). The shipper 121 may be an organization or an individual. The system 100 is configured to include any number of shippers 121. In some cases, the shipper 121 may request a carrier 151 to transport the load. In other cases, the shipper 121 may request a freight broker 131 to find a carrier 151 to transport the load, e.g., in seasonal occasions where the transportation is not already planned or an unexpected transportation of the load is needed.

The shipper 121 is configured to communicate the request to the data transformation device 170 via the integrated application 129. The data transformation device 170 may evaluate the request, identify the correct identity of other entities 102 even if the request includes anomalous information, generate a mapped dataset based on the determined/predicted correct information, and communicate the request to the freight broker 131. An example of data communication between the shipper 121 and the data transformation device 170 is described in greater detail in FIGS. 2 and 3.

The shipper 121 may be associated with a computing device 120 (also referred to herein as a shipper device). The shipper 121 may provide and/or receive hardware and/or software resources to and from other components of the system 100 via the computing device 120. The computing device 120 is generally any device that is configured to process data, communicate with other devices via the network 110, and/or interact with users. Examples of the computing device 120 include but are not limited to, a personal computer, a desktop computer, a workstation, a server, a laptop, a tablet computer, a mobile phone (such as a smartphone), or any other suitable type of device. The computing device 120 may include a user interface, such as a display, a microphone, a camera, a keypad, or other appropriate terminal equipment usable by users.

The computing device 120 may include the hardware processor 122, the network interface 124, and the memory 126. The components of the computing device 120 are operably coupled to on another. Processor 122 comprises one or more processors operably coupled to the memory 126. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 128) to perform the operations of the shipper 121 and shipper device 120 described herein. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-5. For example, the processor 122 may be configured to perform one or more operations of method 300 as described in FIG. 3.

Network interface 124 is configured to enable wired and/or wireless communications. The network interface 124 may be configured to communicate data between the computing device 120 and other devices, systems, or domains of the system 100. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol.

The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc. The memory 126 comprises one or more disks, tape drives, or solid-state drives, and may be used as an over-flow data storage device, to store programs when such programs are selected for execution, and to store instructions and data that are read during program execution. The memory 126 may store any of the information described in FIGS. 1-5 along with any other data, instructions, logic, rules, or code operable to implement the function(s) described herein when executed by processor 122. For example, the memory 126 may store software instructions 128, integrated application 129, and/or any other data or instructions. The software instructions 128 may comprise any suitable set of instructions, logic, rules, or code operable to execute the processor 122 and perform the functions described herein, such as some or all of those described in FIGS. 1-5. The integrated application 129 may be implemented by a software application. The data transformation device 170 may be configured to interact with the integrated application 129 to communicate data with the shipper 121. In certain embodiments, the integrated application 129 may be configured to perform accounting operations of the shipper 121 with respect to the transportation ecosystem.

Freight Broker

Each freight broker 131 may be associated with a computing device 130. The computing device 130 comprises a processor 132 in signal communication with a memory 136. The memory 136 stores software instructions 138 that when executed by the processor 132 cause the computing device 130 to perform one or more operations of the freight broker 131 described herein. Freight broker 131 may be or include an entity that facilitates finding a carrier 151 for shipping a load associated with the shipper 121 in response to receiving a request from the shipper 121 to find a carrier 151. The freight broker 131 may be an organization or an individual. The system 100 is configured to include any number of freight brokers 131. The freight broker 131 may be associated with a computing device 130 (also referred to herein as a freight broker device). The freight broker 131 may provide and/or receive hardware and/or software resources to and from other components of the system 100 via the computing device 130.

The computing device 130 may be an instance of the computing device 120. The computing device 130 is generally any device that is configured to process data, communicate with other devices via the network 110, and/or interact with users. Examples of the computing device 130 include, but are not limited to, a personal computer, a desktop computer, a workstation, a server, a laptop, a tablet computer, a mobile phone (such as a smartphone), or any other suitable type of device. The computing device 130 may include a user interface, such as a display, a microphone, a camera, a keypad, or other appropriate terminal equipment usable by users.

The computing device 130 may include the hardware processor 132, the network interface 134, and the memory 136. The components of the computing device 130 are operably coupled to on another. Processor 132 comprises one or more processors operably coupled to the memory 136. The processor 132 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 132 may be a programmable logic device, a microcontroller, a microprocessor, or any suitable number and combination of the preceding. The one or more processors are configured to process data and may be implemented in hardware or software. For example, the processor 132 may be 8-bit, 16-bit, 32-bit, 64-bit, or of any other suitable architecture. The processor 132 may include an ALU for performing arithmetic and logic operations. The processor 132 may register the supply operands to the ALU and store the results of ALU operations. The processor 132 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 138) to perform the operations of the freight broker 131 and freight broker device 130 described herein. In this way, processor 132 may be a special-purpose computer designed to implement the functions disclosed herein. In an embodiment, the processor 132 is implemented using logic units, FPGAs, ASICs, DSPs, or any other suitable hardware. The processor 132 is configured to operate as described in FIGS. 1-5. For example, the processor 132 may be configured to perform one or more operations of method 300 as described in FIG. 3.

Network interface 134 is configured to enable wired and/or wireless communications. The network interface 134 may be configured to communicate data between the computing device 130 and other devices, systems, or domains of the system 100. For example, the network interface 134 may comprise an NFC interface, a Bluetooth interface, a Zigbee interface, a Z-wave interface, an RFID interface, a WIFI interface, a LAN interface, a wide area network WAN interface, a MAN interface, a PAN interface, a WPAN interface, a modem, a switch, and/or a router. The processor 132 may be configured to send and receive data using the network interface 134. The network interface 134 may be configured to use any suitable type of communication protocol.

The memory 136 may be volatile or non-volatile and may comprise ROM, RAM, TCAM, DRAM, and SRAM. The memory 136 may include one or more of a local database, cloud database, NAS, etc. The memory 136 comprises one or more disks, tape drives, or solid-state drives, and may be used as an over-flow data storage device, to store programs when such programs are selected for execution, and to store instructions and data that are read during program execution. The memory 136 may store any of the information described in FIGS. 1-5 along with any other data, instructions, logic, rules, or code operable to implement the function(s) described herein when executed by processor 132. For example, the memory 136 may store software instructions 138, integrated application 139, and/or any other data or instructions. The software instructions 138 may comprise any suitable set of instructions, logic, rules, or code operable to execute the processor 132 and perform the functions described herein, such as some or all of those described in FIGS. 1-5. The integrated application 139 may be implemented by a software application. The data transformation device 170 may be configured to interact with the integrated application 139 to communicate data with the freight broker 131. In certain embodiments, the integrated application 139 may be configured to perform operations related to the accounting and transportation management system of the freight broker 131 with respect to the transportation ecosystem.

Factor Entity

Each factor entity 141 may be associated with a computing device 140. The computing device 140 comprises a processor 142 in signal communication with a memory 146. The memory 146 stores software instructions 148 that when executed by the processor 142 cause the computing device 140 to perform one or more operations of the factor entity 141 described herein. Factor entity 141 may be or include an entity that is generally configured to provide hardware and/or software resources (e.g., services) to the carrier 151. For example, the factor entity 141 may act as a back office of the carrier 151 that handles eliciting information, messages, and/or documents from other entities 102 on behalf of the carrier 151. In certain embodiments, the factor entity 141 may obtain assets (invoices) from the carrier 151 after evaluating documentations that supports the carrier 151's completion of a service (e.g., transporting a load). The factor entity 141 may be an organization or an individual. The system 100 is configured to include any number of factor entity 141. The factor entity 141 may be associated with a computing device 140 (also referred to herein as a factor entity device). The factor entity 141 may provide hardware and/or software resources (e.g., services) to other components of the system 100 via the computing device 140.

The computing device 140 may be an instance of the computing device 120. The computing device 140 is generally any device that is configured to process data, communicate with other device via the network 110, and/or interact with users. Examples of the computing device 140 include but are not limited to, a personal computer, a desktop computer, a workstation, a server, a laptop, a tablet computer, a mobile phone (such as a smartphone), or any other suitable type of device. The computing device 140 may include a user interface, such as a display, a microphone, a camera, a keypad, or other appropriate terminal equipment usable by users.

The computing device 140 may include the hardware processor 142, the network interface 144, and the memory 146. The components of the computing device 140 are operably coupled to on another. Processor 142 comprises one or more processors operably coupled to the memory 146. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and store the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the computing device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of method 300 as described in FIG. 3.

Network interface 144 is configured to enable wired and/or wireless communications. The network interface 144 may be configured to communicate data between the computing device 140 and other devices, systems, or domains of the system 100. For example, the network interface 144 may comprise an NFC interface, a Bluetooth interface, a Zigbee interface, a Z-wave interface, an RFID interface, a WIFI interface, a LAN interface, a wide area network WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be volatile or non-volatile and may comprise ROM, RAM, TCAM, DRAM, and SRAM. The memory 146 may include one or more of a local database, cloud database, NAS, etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-5 along with any other data, instructions, logic, rules, or code operable to implement the function(s) described herein when executed by processor 142. For example, the memory 146 may store software instructions 148, integrated application 149, and/or any other data or instructions. The software instructions 148 may comprise any suitable set of instructions, logic, rules, or code operable to execute the processor 142 and perform the functions described herein, such as some or all of those described in FIGS. 1-5. The integrated application 149 may be implemented by a software application. The data transformation device 170 may be configured to interact with the integrated application 149 to communicate data with the factor entity 141. In certain embodiments, the integrated application 149 may be configured to perform operations related to freight management system of the factor entity 141 with respect to the transportation ecosystem.

Carrier

Each carrier 151 may be associated with a computing device 150. The computing device 150 comprises a processor 152 in signal communication with a memory 156. The memory 156 stores software instructions 158 that when executed by the processor 152 cause the computing device 150 to perform one or more operations of the carrier 151 described herein. Carrier 151 may be or include an entity that is generally configured to transport the load associated with the shipper 121. For example, the carrier 151 may be a trucking organization, a freight transportation organization, a shipping organization, and the like. The system 100 is configured to include any number of carriers 151. The carrier 151 may be associated with a computing device 150 (also referred to herein as a carrier device). The carrier 151 may provide hardware and/or software resources (e.g., shipping the load and/or services) to other components of the system 100 via the computing device 150.

The computing device 150 may be an instance of the computing device 120. The computing device 150 is generally any device that is configured to process data, communicate with other devices via the network 110, and/or interact with users. Examples of the computing device 150 include but are not limited to, a personal computer, a desktop computer, a workstation, a server, a laptop, a tablet computer, a mobile phone (such as a smartphone), or any other suitable type of device. The computing device 150 may include a user interface, such as a display, a microphone, a camera, a keypad, or other appropriate terminal equipment usable by users.

The computing device 150 may include the hardware processor 152, the network interface 154, and the memory 156. The components of the computing device 150 are operably coupled to on another. Processor 152 comprises one or more processors operably coupled to the memory 156. The processor 152 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 152 may be a programmable logic device, a microcontroller, a microprocessor, or any suitable number and combination of the preceding. The one or more processors are configured to process data and may be implemented in hardware or software. For example, the processor 152 may be 8-bit, 16-bit, 32-bit, 64-bit, or of any other suitable architecture. The processor 152 may include an ALU for performing arithmetic and logic operations. The processor 152 may register the supply operands to the ALU and store the results of ALU operations. The processor 152 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 158) to perform the operations of the computing device 150 described herein. In this way, processor 152 may be a special-purpose computer designed to implement the functions disclosed herein. In an embodiment, the processor 152 is implemented using logic units, FPGAS, ASICs, DSPs, or any other suitable hardware. The processor 152 is configured to operate as described in FIGS. 1-5. For example, the processor 152 may be configured to perform one or more operations of method 300 as described in FIG. 3.

Network interface 154 is configured to enable wired and/or wireless communications. The network interface 154 may be configured to communicate data between the computing device 150 and other devices, systems, or domains of the system 100. For example, the network interface 154 may comprise an NFC interface, a Bluetooth interface, a Zigbee interface, a Z-wave interface, an RFID interface, a WIFI interface, a LAN interface, a wide area network WAN interface, a MAN interface, a PAN interface, a WPAN interface, a modem, a switch, and/or a router. The processor 152 may be configured to send and receive data using the network interface 154. The network interface 154 may be configured to use any suitable type of communication protocol.

The memory 156 may be volatile or non-volatile and may comprise ROM, RAM, TCAM, DRAM, and SRAM. The memory 156 may include one or more of a local database, cloud database, NAS, etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-5 along with any other data, instructions, logic, rules, or code operable to implement the function(s) described herein when executed by processor 152. For example, the memory 156 may store software instructions 158, integrated application 159, and/or any other data or instructions. The software instructions 158 may comprise any suitable set of instructions, logic, rules, or code operable to execute the processor 152 and perform the functions described herein, such as some or all of those described in FIGS. 1-5. The integrated application 159 may be implemented by a software application. The data transformation device 170 may be configured to interact with the integrated application 159 to communicate data with the carrier 151. In certain embodiments, the integrated application 159 may be configured to perform operations related to transportation management system of the carrier 151 with respect to the transportation ecosystem.

Trusted Sources

Trusted sources 160 may generally include or be associated with any storage architecture. Examples of the trusted sources 160 may include, but are not limited to, a network-attached storage cloud, a storage area network, and a storage assembly directly (or indirectly) coupled to one or more components of the system 100. The trusted sources 160 may be configured to store trusted datasets 162. The trusted datasets 162 may include correct information about the carriers 151 and freight broker 131. For example, upon establishment, each carrier 151 may register at an external agency 164 that maintains information related to the carriers 151 in the trusted sources 160. Similarly, upon establishment, each freight broker 131 may register at an external agency 164 that maintains information related to the freight broker 131 in the trusted sources 160. For example, the trusted dataset 162 associated with a freight broker 131 may include a name, identifying numbers (e.g. a serial number, a registration number, etc.), an address, and a phone number with respect to the freight broker 131. In another example, the trusted dataset 162 associated with a carrier 151 may include a name, identifying numbers (e.g. a serial number, a registration number, etc.), an address, and a phone number with respect to the carrier 151. The data transformation device 170 may access the trusted dataset 162 and use it to identify correct information about the carrier 151 and/or freight broker 131.

In certain embodiments, the trusted sources 160 may include correct information about other entities 102, e.g., the shippers 121 and factors 141. For example, the trusted dataset 162 associated with a shipper 121 may include a name, identifying numbers (e.g. a serial number, a registration number, etc.), an address, and a phone number with respect to the shipper 121. In another example, the trusted dataset 162 associated with a factor 141 may include a name, identifying numbers (e.g. a serial number, a registration number, etc.), an address, and a phone number with respect to the factor 141. The data transformation device 170 may then use this information for data correction, data transformation, and data mapping. The operation of the data transformation device 170 is described in greater detail in FIG. 3.

Data Mapping and Transformation Device

Data transformation device 170 generally includes a hardware computer system configured to implement the data correction, data transformation, data mapping, and data communication with respect to the entities 102. In certain embodiments, the data transformation device 170 may be implemented by a cluster of computing devices, such as virtual machines. For example, the data transformation device 170 may be implemented by a plurality of computing devices using distributed computing and/or cloud computing systems in a network. In certain embodiments, the data transformation device 170 may be configured to provide services and resources (e.g., data and/or hardware resources) for the components of the system 100.

The data transformation device 170 may be configured to perform data mapping, transformation, and correction. For example, assume that the data transformation device 170 receives a file, a document, a message, an email, a facsimile (collectively referred to herein as a message) from a first entity 102 (e.g., any of the shipper 121, freight broker 131, factor 141, and carrier 151). The received message may include the first entity's internal reference to another entity 102. The received message may also include information about a load that is shipped, is to be shipped, is being shipped, such as type, amount, weight, etc., and any other information. In some cases, the received message may include anomalous information about another entity 102, the load, and/or other data. The data transformation device 170 is configured to compare the received message with the trusted dataset 162, identify which data is anomalous (e.g., is incomplete or incorrect), identity the correct information with respect to the identified anomalous data, and transform the anomalous data into the correct information.

In this process, the data transformation device 170 may extract a set of data elements from the received message. The set of data elements may depend on what is the received message. For example, if the received message is a load data 180 that includes information about the load, freight broker 131, carrier 151, and factor 141, the set of data elements includes identifies of the load, freight broker 131, carrier 151, and factor 141. The data transformation device 170 may then associate each data element from the extracted set of data elements to a respective data field in the trusted dataset 162. In this manner, the data transformation device 170 may identify which data is anomalous, identify respective correct information from the trusted dataset 162, and replace the identified anomalous data with the correct information.

The data transformation device 170 may use historical information 190 received from the entities 102 and/or historical data corrections for data mapping, correction, and transformation previously performed by the data transformation device 170 and/or operators in addition to or instead of the trusted datasets 162. For example, the data transformation device 170 may use historical information 190 that is determined to be correct for comparing with data elements extracted from a new incoming message and identifying the anomalous data in the received message. In the same or another example, the data transformation device 170 may use the intelligence or results achieved from the historical data corrections (e.g., reviewed and confirmed by operators) for comparing with data elements extracted from a new incoming message and identifying the anomalous data in the received message.

The data transformation device 170 may be configured to learn the associations and relationships of data elements in a received message with respective data fields in trusted datasets 162 and/or to respective correct information derived from historical data corrections (e.g., based on feedback from operators) and/or with respective information referred by other entities 102. For example, the data transformation device 170 may implement a data extraction machine learning module 192 to perform the mapping operation. In the same or another example, the data transformation device 170 may implement object-oriented programming to perform the data mapping operation. These examples are described further below in conjunction with FIGS. 2-5.

The data transformation device 170 includes a processor 172 in signal communication with a network interface 174 and a memory 176. transformation device 170 The memory 176 stores software instructions 178 that when executed by the processor 172 cause the data transformation device 170 to perform one or more operations of the data transformation device 170 described herein. The trusted sources 160 may include or be associated with database(s) that store information that can be used by the data transformation device 170. Processor 172 comprises one or more processors. The processor 172 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 172 may be a programmable logic device, a microcontroller, a microprocessor, or any suitable number and combination of the preceding. The one or more processors are configured to process data and may be implemented in hardware or software. For example, the processor 172 may be 8-bit, 16-bit, 32-bit, 64-bit, or of any other suitable architecture. The processor 172 may include an ALU for performing arithmetic and logic operations. The processor 172 may register the supply operands to the ALU and store the results of ALU operations. The processor 172 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 178) to perform the operations of the data transformation device 170 described herein. In this way, processor 172 may be a special-purpose computer designed to implement the functions disclosed herein. In an embodiment, the processor 172 is implemented using logic units, FPGAs, ASICs, DSPs, or any other suitable hardware. The processor 172 is configured to operate as described in FIGS. 1-5. For example, the processor 172 may be configured to perform one or more operations of method 300 as described in FIG. 3, and one or more operations of method 500 as described in FIG. 5.

Network interface 174 is configured to enable wired and/or wireless communications. The network interface 174 may be configured to communicate data between the data transformation device 170 and other devices, systems, or domains of the system 100. For example, the network interface 174 may comprise an NFC interface, a Bluetooth interface, a Zigbee interface, a Z-wave interface, an RFID interface, a WIFI interface, a LAN interface, a wide area network WAN interface, a MAN interface, a PAN interface, a WPAN interface, a modem, a switch, and/or a router. The processor 172 may be configured to send and receive data using the network interface 174. The network interface 174 may be configured to use any suitable type of communication protocol.

The memory 176 may be volatile or non-volatile and may comprise ROM, RAM, TCAM, DRAM, and SRAM. The memory 176 may include one or more of a local database, cloud database, NAS, etc. The memory 176 comprises one or more disks, tape drives, or solid-state drives, and may be used as an over-flow data storage device, to store programs when such programs are selected for execution, and to store instructions and data that are read during program execution. The memory 176 may store any of the information described in FIGS. 1-5 along with any other data, instructions, logic, rules, or code operable to implement the function(s) described herein when executed by processor 172. For example, the memory 176 may store software instructions 178, load data 180, data elements 182a-c, mapped datasets 184a-b, first message 186, second message 188, trusted dataset 162, historical information 190, data extraction machine learning module 192, data packets 204, 212, historical user behavior information 422, messages 410a-b, distances 434, threshold distance 432, location coordinates 420a-n, 430a-n, feature vectors 418, 428, and/or any other data or instructions. The software instructions 178 may comprise any suitable set of instructions, logic, rules, or code operable to execute the processor 172 and perform the functions described herein, such as some or all of those described in FIGS. 1-5.

The data extraction machine learning module 192 may be implemented by the processor 172 executing the software instructions 178, and is generally configured to select and extract each data element 182 from a message 410a-b (e.g., load data 180, message 186, message 188, data packet 204, and the like) and associate the extracted data element to a respective data field in the mapped dataset 184. In certain embodiments, the data extraction machine learning module 192 may include a support vector machine, neural network, random forest, k-means clustering. Tree-based algorithm, Random Forest algorithm, etc. In certain embodiments, the data extraction machine learning module 192 may include image processing, text processing, natural language processing, object recognition, and the like. The data extraction machine learning module 192 may be trained by a training dataset (e.g., historical user behavior information 422) that may include sample data mappings performed by users. The data extraction machine learning module 192 may use the sample data mappings performed by users as the training dataset to determine and learn what data elements 414a-n (see FIG. 4) from messages 410a-b (see FIG. 4) should be mapped to which data fields 412a-n (see FIG. 4).

The historical information 190 may include information about the entities 102 that is determined to be correct, e.g., based on feedback from operators. For example, the historical information 190 may include a name, identifying numbers (e.g. a serial number, a registration number, etc.), an address, and a phone number with respect to each entity 102. In the same or another example, the historical information 190 may include correct data/information associated with the entities 102 determined from the historical transportations where data mapping and corrections were performed, e.g., by the data transformation device 170 and/or operators. Other information stored in the memory 176 is described in FIGS. 2 through 5.

Example Operational Flow for Data Mapping, Correction, and Transformation

Figure 2:
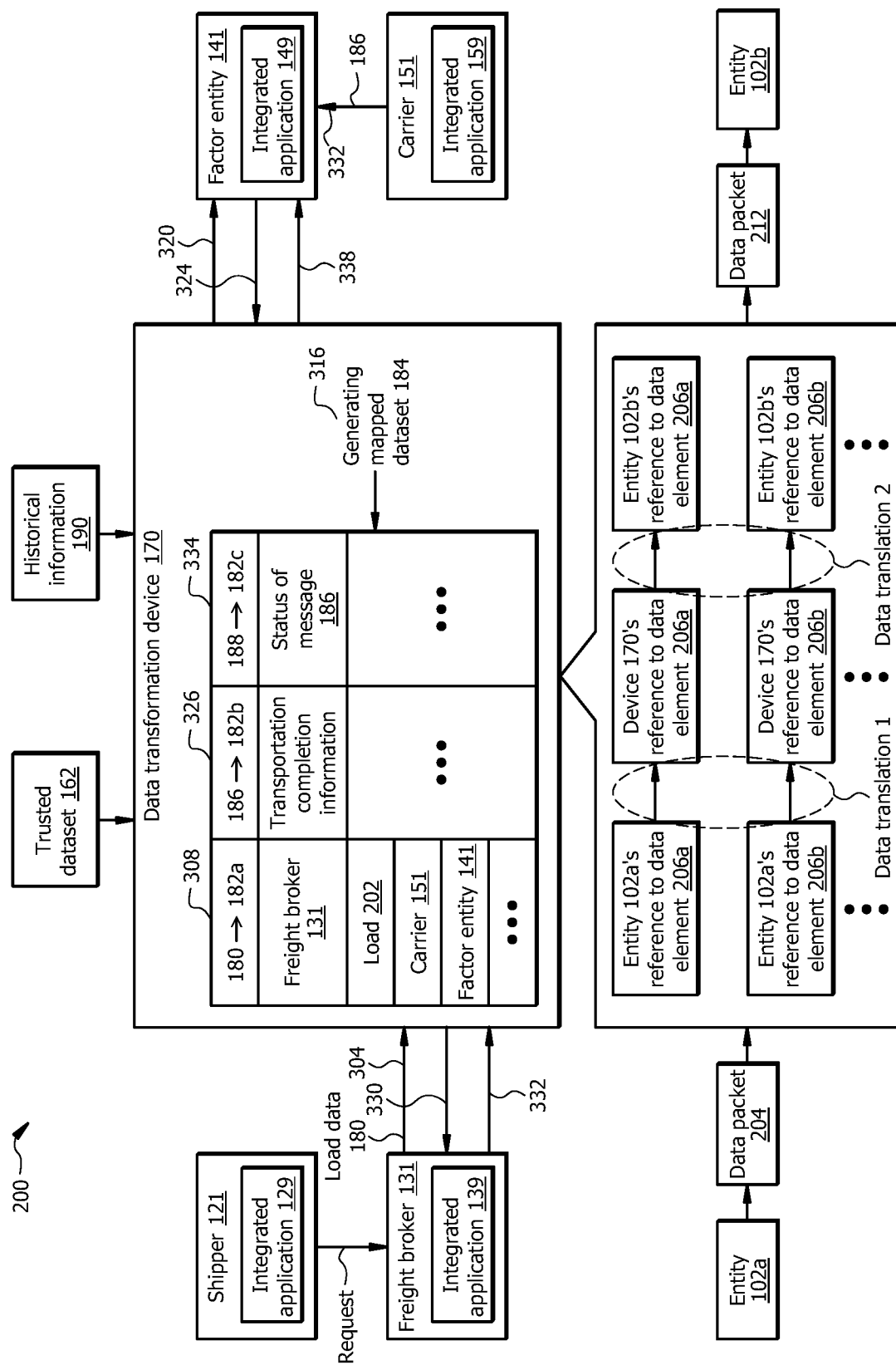
FIG. 2 illustrates an example operational flow of the system of FIG. 1 for providing data mapping, transformation, correction, and communication among entities via a network.

FIG. 2 illustrates an embodiment of an operational flow 200 of the system 100 (see FIG. 1) for data mapping, correction, and transformation. The example operational flow 200 describes a particular example use case where the data transformation device 170 facilitates data communication among entities 102 (see FIG. 1). Details of the operational flow 200 are described in FIG. 3. In brief, assume that the shipper 121 wants to transport a load from a first physical location to a second physical location at a particular time. The shipper 121 may request the freight broker 131 to find an available carrier 151 that can transport the load from the first physical location to the second physical location at the particular time. Also, assume that the freight broker 131 finds the carrier 151 for the load transportation. The carrier 151 is associated with the factor entity 141 that provides software resources (e.g., services) to the carrier 151 to elicit and collect documents from other entities 102.

During the operational flow 200, multiple files, documents, messages, and pieces of data (collectively referred to herein as a message) may be transmitted between the entities 102 via the data transformation device 170. At any operation where the data transformation device 170 receives a message, the data transformation device 170 may extract data elements from the message, associate each data element with a respective data field, and add the mapped data element to the mapped dataset 184. Examples of mapping and adding various data elements to the mapped dataset 184 are described in respective operations of the method 300 in FIG. 3.

Example Data Mapping Operation

The data transformation device 170 may be configured to perform data translation and mapping on any inbound and outbound communication with an entity 102. For example, assume that a first entity 102a communicates a data packet 204 to the data transformation device 170. The data packet 204 may include any information related to transportation of a load and/or any of the entities 102. For example, the data packet 204 may be any of the load data 180, the first message 186, the second message 188, and other documents related to scheduling information for the transportation, among others. The first entity 102a may be any of the entities 102 described in FIG. 1.

For the incoming data packets 204, the data transformation device 170 may extract a set of data elements 206 from the data packet 204. The data transformation device 170 may associate or translate each data element 206 to a respective reference used by the data transformation device 170. For example, the data transformation device 170 may associate the entity 102a's reference to data element 206a to the device 170's reference to the data element 206a. The data element 206a may be any piece of information extracted from the data packet 204, such as an identifier of the freight broker 131, shipper 121, factor entity 141, carrier 151, load 202, message 186, message 188, message 186 status, scheduling information, among others. The device 170's reference to the data element 206a may include respective or corresponding information with respect to the data element 206a used by the entity 102a that is determined to be correct based on comparing with the trusted dataset 162 and/or historical information 190, and/or historical user behavior information 422 similar to that described in FIG. 1. Similarly, the data transformation device 170 may associate the entity 102a's reference to data element 206b to the device 170's reference to the data element 206b. Each data element in any of the data elements 182a-c described in FIG. 3 may be an example of the data elements 206a-b. In this manner, the data transformation device 170 performs a first data mapping, translation, correction, and transformation on the incoming data packets 204.

For the outgoing data packets 212, the data transformation device 170 may perform a second data mapping, translation, correction, and transformation. In certain embodiments, for example, before the data transformation device 170 communicates an outbound data packet 212 to a second entity 102b, the data transformation device 170 may determine the references to data elements that the second entity 102b uses, e.g., based on historical information 190 and/or historical records and communication with the second entity 102b. For example, the data transformation device 170 may associate the device 170's reference to data element 206a to the second entity 102b' reference to the data element 206a, and associate the device 170's reference to data element 206b to the second entity 102b' reference to the data element 206b. The second entity 102b may be any of the entities 102 described in FIG. 1.

In certain embodiments, the data packet 212 may include the second entity 102b's references to the data elements 206. In certain embodiments, the data transformation device 170 may perform a reverse operation of the first data mapping instead of the second data mapping for the outgoing data packets 212. For example, the data transformation device 170 may translate back the device 170's reference to the data element 206a to the entity 102a's reference to the data element 206a, and translate back the device 170's reference to the data element 206b to the entity 102a's reference to the data element 206b, and include this information in the outgoing data packet 204b.

Example Method for Data Mapping, Correction, and Transformation

Figure 3:
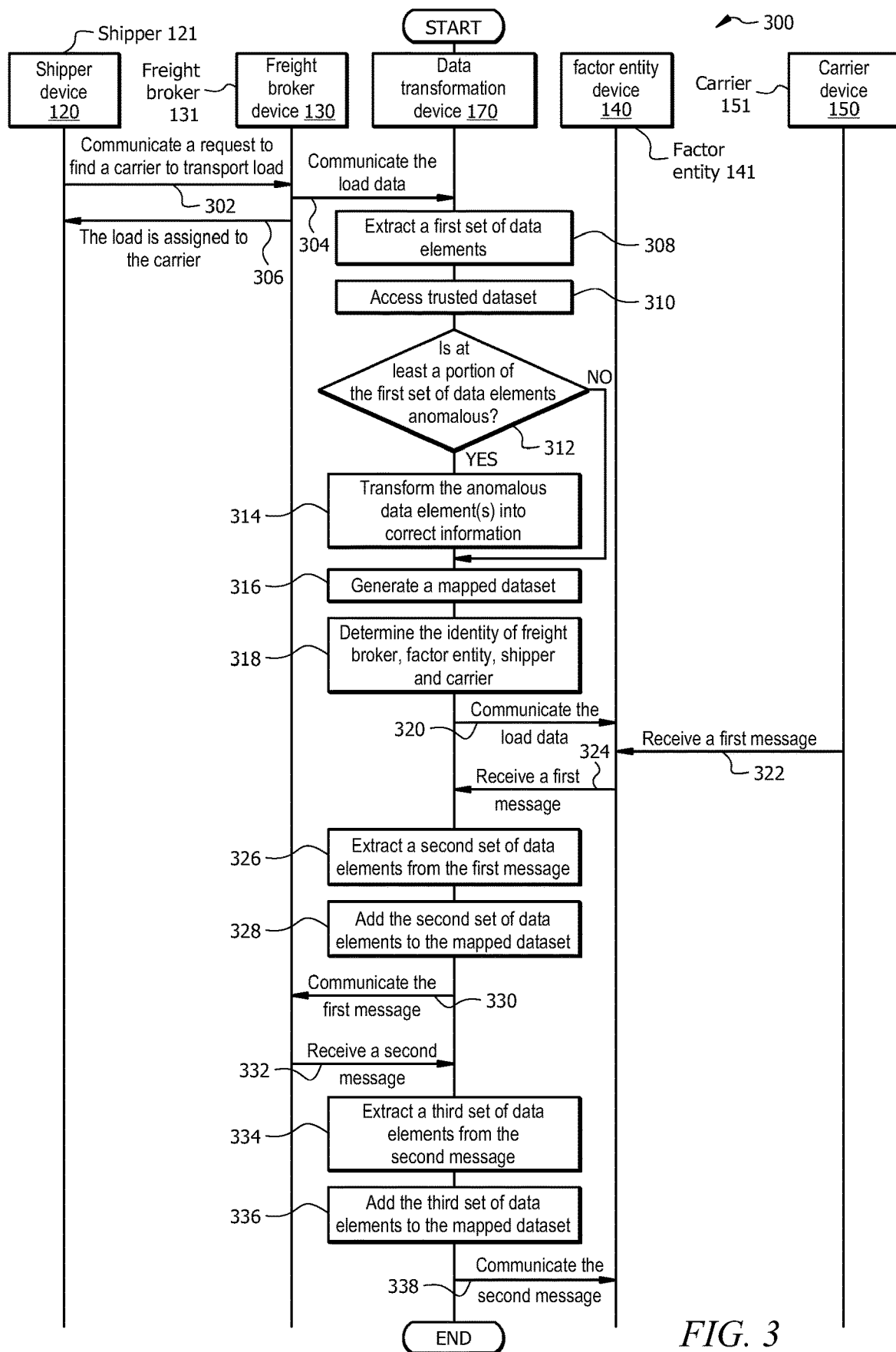
FIG. 3 illustrates an example flowchart of a method for providing data mapping, transformation, correction, and communication among entities via a network.

FIG. 3 illustrates an example method 300 of system 100 of FIG. 1 for data mapping, correction, and transformation for entities 102 in the freight network ecosystem. Modifications, additions, or omissions may be made to method 300. Method 300 may include more, fewer, or other operations. For example, operations may be performed in parallel or in any suitable order. While at times discussed as the system 100, data transformation device 170, shipper device 120, freight broker device 130, factor entity device 140, carrier device 150, or components of any of thereof performing operations, any suitable system or components of the system may perform one or more operations of the method 300. For example, one or more operations of method 300 may be implemented, at least in part, in the form of software instructions 128, 138, 148, 158, and 178 of FIG. 1, stored on non-transitory, tangible, machine-readable media (e.g., memories 126, 136, 146, 156, and 176 of FIG. 1) that when run by one or more processors (e.g., processors 122, 132, 142, 152, and 172 of FIG. 1) may cause the one or more processors to perform operations 302-336.

The method 300 begins at operation 302 where the shipper 121, via the shipper device 120 communicates a request to find a carrier 151 to transport a load to the freight broker device 130. For example, the request may include an identifier of the load, a type of the load, a volume of the load, a start location, a destination, the desired departure time, the desired arrival time, among other criteria indicated by the shipper 121. In certain embodiments, the shipper 121 may communicate the request to the data transformation device 170 directly.

At operation 304, the freight broker device 130 communicates the load data 180 to the data transformation device 170. The data transformation device 170 receives the load data 180. The load data 180 may indicate that the load is assigned to a particular carrier 151 to be transported from the determined start location to the destination. The load data 180 may include other information as indicated in the request. The load data 180 may also indicate that the load is associated with the shipper 121. The particular carrier 151 may be associated with the factor entity 141 that facilitates keeping records of documents or messages (e.g., message 186) for the particular carrier 151. In certain embodiments, the load data 180 may be unstructured data—meaning that the load data 180 may not follow a data structure schema, for example. In certain embodiments, the load data 180 may be semi-structured data—meaning that the load data 180 may include a mix of structured and unstructured data, where the structured data may follow a particular data structure schema, and the unstructured data may not follow a data structure schema. In certain embodiments, the load data 180 may be structured data. The load data 180 may include anomalous data, such as incomplete and/or incorrect information about other entities 102, the load, or any information with respect to the transportation of the load. This may be because the freight broker 131 may not have updated information about other entities 102 or information about the load or other aspects related to the transportation of the load are input incorrectly by an operator in the load data. The load data 180 may be an example of a data packet 204 described in FIG. 2. Therefore, the data transformation device 170 may perform data mapping, transformation, and correction on the load data 180, similar to that described in FIG. 2 and further described in operations of method 300 in FIG. 3. At operation 306, the freight broker device 130 may communicate an acknowledgment message indicating that the load is assigned to the particular carrier 151 to the shipper device 120.

At operation 308, the data transformation device 170 extracts a first set of data elements 182a from the load data 180. Referring back to FIG. 2, the data transformation device 170 extracts the identifiers of the freight broker 131, the load 202, the carrier 151, and the factor entity 141 from the load data 180 (e.g., the data elements 182a) received from the freight broker 131 at operation 304 and adds them to the mapped dataset 184.

Referring to FIG. 3, in certain embodiments, the data transformation device 170 may implement object-oriented programming to extract the set of data elements 182a from the load data 180. For example, the data transformation device 170 may treat each data field in the load data as a data object. The data transformation device 170 may parse the data load 180 and extract the set of data elements 182a.

In certain embodiments, the data transformation device 170 may implement the data extraction machine learning module 192 to extract the set of data elements 182a from the load data 180. This operation is described in greater detail in FIG. 4. The first set of data elements 182a may comprise indications or identifiers of the freight broker 131, the factor entity 141, the shipper 121, the carrier 151, the load 202, or any other information associated with the transportation of the load.

At operation 310, the data transformation device 170 accesses the trusted dataset 162. For example, the data transformation device 170 may send a query message to the trusted sources 160 to provide the trusted dataset 162 associated with the entities 102 referred to in the load data 180. The data transformation device 170 may also access historical information 190 and historical data communications among the entities 102.

At operation 312, the data transformation device 170 determines whether at least a portion of the first set of data elements 182a is anomalous. In other words, the data transformation device 170 may determine whether the first set of data elements 182a includes incorrect, incomplete, or stale information about any of the entities 102 or the load.

In this process, in certain embodiments, the data transformation device 170 may compare each data element 182a with a respective data element from the trusted dataset 162 and determine whether each data element 182a corresponds to a respective data element from the trusted dataset 162. If it is determined that a data element 182a does not correspond to the respective data element in the trusted dataset 162, the data transformation device 170 may determine that the data element 182a is anomalous. Otherwise, the data transformation device 170 may determine that the data element 182a is not anomalous.

In certain embodiments, the data transformation device 170 may compare each data element 182a with a respective data element derived from the historical information 190 and determine whether each data element 182a corresponds to a respective data element from the historical information 190. If it is determined that a data element 182a does not correspond to the respective data element in the historical information 190, the data transformation device 170 may determine that the data element 182a is anomalous. Otherwise, the data transformation device 170 may determine that the data element 182a is not anomalous.

In certain embodiments, the data transformation device 170 may compare each data element 182a with a respective data element derived from the trusted dataset 162 and/or historical information 190, and determine whether each data element 182a corresponds to a respective data element from the trusted dataset 162 and/or historical information 190. If the data transformation device 170 determines or identifies an inconsistency between a data element 182a and a respective data element from the trusted dataset 162 and/or historical information 190, it is determined that the data element 182a is anomalous. Otherwise, the data transformation device 170 may determine that the data element 182a is not anomalous. In certain embodiments, the data transformation device 170 may perform the above operation on any incoming data packet (e.g., data packet 204, first message 186, second message 188, etc.) to determine whether the incoming data packet includes anomalous data. If it is determined that the first set of data elements 182a does not include anomalous information, method 300 proceeds to operation 316. Otherwise, the method 300 proceeds to operation 314.

At operation 314, the data transformation device 170 transforms the anomalous data element(s) 182a into respective correct information, e.g., retrieved from the trusted dataset 162 and/or the historical information 190. For example, in this process, the data transformation device 170 may replace the anomalous data element(s) 182a with respective information retrieved from the trusted dataset 162 and/or the historical information 190.

At operation 316, the data transformation device 170 generates a mapped dataset 184. In this process, the data transformation device 170 may associate each data element 182a to a respective data element (derived from the trusted dataset 162 and/or the historical information 190). The data transformation device 170 may also add the mapped data elements 182a to the mapped dataset 184.

Referring back to FIG. 2, at operation 316, after the freight broker 131 communicates the load data 180 to the data transformation device 170 via the freight broker device 130 and integrated application 139, the data transformation device 170 may extract indications or identifiers of the freight broker 131, the load 202, the carrier 151, and the factor entity 141, associate each of these data elements 182a to a respective data element (derived from the trusted dataset 162 and/or the historical information 190), and include this information in the mapped dataset 184.

Referring to FIG. 3, the description below described example embodiments of generating the mapped dataset 184. In certain embodiments, the data transformation device 170 may perform the operations below for the mapping operation of the information related to the carrier 151. The data transformation device 170 may compare information related to the carrier 151 as indicated in the load data 180 with the information related to each carrier 151 retrieved from the trusted dataset 162 and/or the historical information 190. For example, the data transformation device 170 may determine that a majority (e.g., more than a threshold percentage, such as 90%, 95%, etc.) of the data elements derived from the trusted dataset 162 and/or historical information 190 corresponds to respective data elements associated with the carrier 151. In another word, the data transformation device 170 may find a matching or corresponding information for the carrier 151 in the trusted dataset 162 and/or historical information 190. In response, the data transformation device 170 may determine that a carrier with a matching profile/information indicated in the trusted dataset 162 and/or historical information 190 is the same as the carrier 151.

For data correction operation, the data transformation device 170 may identify anomalous data associated with the carrier 151 as included in the first set of data elements 182a. The anomalous data may include incomplete or incorrect information about the carrier 151. The data transformation device 170 transforms at least a portion of the load data 180 (that includes the identified anomalous data) into structured data (e.g., in a portion of the mapped dataset 184 in a data table) that includes the correct information about the carrier 151 that is derived from the trusted dataset 162 and/or historical information 190. In this process, the data transformation device 170 may replace the anomalous data with the correct information about the carrier 151. The data transformation device 170 may include the correct information about the carrier 151 in the mapped dataset 184.

In certain embodiments, the data transformation device 170 may perform the operations below for mapping operation of information related to the freight broker 131. The data transformation device 170 may compare information related to the freight broker 131 as indicated in the load data 180 with the information related to each freight broker 131 retrieved from the trusted dataset 162 and/or the historical information 190. For example, the data transformation device 170 may determine that a majority (e.g., more than a threshold percentage, such as 90%, 95%, etc.) of the data elements derived from the trusted dataset 162 and/or historical information 190 corresponds to respective data elements associated with the freight broker 131. In another word, the data transformation device 170 may find matching or corresponding information for the freight broker 131 in the trusted dataset 162 and/or historical information 190. In response, the data transformation device 170 may determine that a freight broker with a matching profile/information indicated in the trusted dataset 162 and/or historical information 190 is the same as the freight broker 131.

For data correction operation, the data transformation device 170 may identify anomalous data associated with the freight broker 131 as included in the first set of data elements 182a. The anomalous data may include incomplete or incorrect information about the freight broker 131. The data transformation device 170 transforms at least a portion of the load data 180 (that includes the identified anomalous data) into structured data (e.g., in a portion of the mapped dataset 184 in a table) that includes the correct information about the freight broker 131 that is derived from the trusted dataset 162 and/or historical information 190. In this process, the data transformation device 170 may replace the anomalous data with the correct information about the freight broker 131. The data transformation device 170 may include the correct information about the freight broker 131 in the mapped dataset 184.

In certain embodiments, the data transformation device 170 may perform similar operations with respect to mapping information related to other entities 102 (e.g., shipper 121 and factor 141), the load, etc.

At operation 318, the data transformation device 170 determines the identity of each of the freight broker 131, the factor entity 141, the shipper 121, and the carrier 151. In this process, the data transformation device 170 may determine the identity of the entities 102 based on the mapping operations, similar to that described in operation 314 and FIGS. 1 and 2.

At operation 320, the data transformation device 170 communicates the load data 180 to the factor entity 141 (see also FIG. 2). For example, in response to determining the correct identity of the factor entity 141, the data transformation device 170 may know the correct identity of the factor entity 141 and communicate the load data 180 to the factor entity 141. As mentioned above in operation 304, the load data 180 may be an example of a data packet 204 described in FIG. 2. Therefore, the data transformation device 170 may perform a similar data mapping, transformation, and correction on the load data 180. For example, for incoming data load 180, the data transformation device 170 may associate the freight broker 131's reference to a first data element 182a extracted from the data load 180 (an example of a data element 206a in FIG. 2) to the device 170's reference to the first data element 182a on the first data mapping operation. Similarly, the data transformation device 170 may associate the freight broker 131's reference to a second data element 182a (an example of a data element 206b in FIG. 2) to the device 170's reference to the second data element 182a.

In this example, at operation 320, the load data 180 may be an example of an outgoing data packet 212 described in FIG. 2. For generating the outgoing data packet 212 to the factor entity 141, the data transformation device 170 may associate the device 170's reference to the first data element 182a to the factor entity 141's reference to the first data element 182a, and associate the device 170's reference to the second data element 182a to the factor entity 141's reference to the second data element 182a, similar to that described in FIG. 2. For example, the data transformation device 170 may identify a first reference of the carrier 151 that the factor entity 141 uses or has used based on the historical information 190. The data transformation device 170 may transform a second reference of the carrier 151 that the freight broker 131 has used in the load data 180 into the first reference of the carrier 151, for example, by replacing the second reference of the carrier 151 (used in the load data 180) with the first reference of the carrier 151.

The data transformation device 170 may perform a similar operation for other entities 102. For example, with respect to the shipper 121, the data transformation device 170 may identify a first reference of the shipper 121 used by the factor entity 141 from the historical information 190. The data transformation device 170 may transform a second reference of the shipper 121 used by the freight broker 131 in the load data 180 into the first reference of the shipper 121, e.g., by replacing the second reference of the shipper 121 (used in the load data 180) with the first reference of the shipper 121.

At operation 322, the factor entity device 140 receives a first message 186 from the carrier device 150. The first message 186 may include information about the completion of transportation of the load. For example, when the load is assigned to the carrier 151, the carrier 151 may employ trucks, vehicles, shipping containers, and the like to transport the load as requested by the shipper 121. When the load reaches the destination, the carrier 151 may provide the first message 186 indicating that the load is transported to the destination to the factor entity 141.

In certain embodiment, the shipper 121 and/or the freight broker 131 may be informed that the transportation of the load is complete, e.g., by any of the carrier 151, factor entity 141, or the data transformation device 170. The factor entity 141 may forward the first message 186 to the data transformation device 170. In certain embodiments, the carrier device 150 may communicate the first message 186 to the data transformation device 170. At operation 324, the data transformation device 170 may receive the first message 186, e.g., from the factor entity device 140.

At operation 326, the data transformation device 170 extracts a second set of data elements 182b from the first message 186. Referring back to FIG. 2, the data transformation device 170 extracts data elements 182b including transportation completion information from the first message 186 received from the factor entity 141 at operation 324 and adds the extracted data elements to the mapped dataset 184.

Referring to FIG. 3, the data transformation device 170 may extract the second set of data elements 182b similar to that described in operation 308 with respect to extracting the first set of data elements 182a. The second set of data elements 182b may include information about the completion of the transportation of the load. In certain embodiments, the second set of data elements 182b may also include the cost of the transportation of the load. The first message 186 may be another example of the data packet 204 described in FIG. 2. Therefore, the data transformation device 170 may perform data element extraction, mapping, translation, and correction on the first message 186, similar to that described in FIG. 2. For example, the data transformation device 170 may associate factor entity 141's reference to a first data element 182b (an example of data element 206a in FIG. 2) extracted from the first message 186 to the device 170's reference to the first data element 182b, and associate factor entity 141's reference to a second data element 182b (an example of data element 206b in FIG. 2) extracted from the first message 186 to the device 170's reference to the second data element 182b.

At operation 328, the data transformation device 170 adds the second set of data elements 182b to the mapped dataset 184. Referring back to FIG. 2, at operation 328, after the factor entity 141 communicates the first message 186 to the data transformation device 170 via the factor entity device 140 and integrated application 149, the data transformation device 170 may extract the second set of data elements 182b from the first message 186 and associate each data element 182b to a respective data element (derived from the trusted dataset 162, and/or the historical information 190 which now includes the load data 180), and include this information in the mapped dataset 184.

Referring to FIG. 3, at operation 330, the data transformation device 170 communicates the first message 186 to the freight broker 131 (see also FIG. 2). In this process, the first message 186 may be an example of the outgoing data packet 212 described in FIG. 2. Therefore, the data transformation device 170 may perform data mapping, transformation, and correction on the first message 186 similar to that described in FIG. 2 and operation 320 of the method 300 of FIG. 3. For example, the data transformation device 170 may associate the device 170's reference to a first data element 182b (an example of data element 206a in FIG. 2) extracted from the first message 186 to the freight broker 131's reference to the first data element 182b, and associate the device 170's reference to a second data element 182b (an example of data element 206b in FIG. 2) extracted from the first message 186 to the freight broker 131's reference to the second data element 182b, similar to that described in FIG. 2. For example, the data transformation device 170 may identify a first reference of the shipper 121 used by the freight broker 131 from the historical information 190. The data transformation device 170 may transform a second reference of the shipper 121 used by the factor entity 141 in the first message 186 into the first reference of the shipper 121, e.g., by replacing the second reference of the shipper 121 (used in the first message 186) with the first reference of the shipper 121.

At operation 332, the data transformation device 170 receives a second message 188 from the freight broker device 130. The second message 188 may include the status of the first message 186. For example, the second message 188 may indicate whether the first message 186 is acceptable. In certain embodiments, upon the freight broker 131 receiving the first message 186, operators may review and evaluate the first message 186 and the status of the transportation of the load as indicated in the first message 186. For example, if it is determined that the load is transported to the correct destination as requested by the shipper 121, the cost of transportation is accurate, and other aspects of the transportation of the load are acceptable, an operator associated with the freight broker 131 may indicate that the first message 186 is acceptable in the second message 188. Otherwise, the operator may indicate that the first message 186 is not acceptable in the second message 188.

At operation 334, the data transformation device 170 extracts a third set of data elements 182c from the second message 188. Referring back to FIG. 2, the data transformation device 170 extracts the status of message 186, the cost of shipping of the load, among other information (e.g., data elements 182c) received from the freight broker 131 at operation 332 and adds it to the mapped dataset 184.

Referring to FIG. 3, the data transformation device 170 may extract the third set of data element 182c using object-oriented programming and/or a machine learning module similar to that described in operation 308 with respect to extracting the first set of data elements 182a. In operation 334, the second message 188 may be an example of an incoming data packet 204 described in FIG. 2. Therefore, the data transformation device 170 may perform data element extraction, mapping, translation, and correction on the second message 188, similar to that described in FIG. 2. For example, the data transformation device 170 may associate freight broker 131's reference to a first data element 182c (an example of data element 206a in FIG. 2) extracted from the second message 188 to the device 170's reference to the first data element 182c, and associate freight broker 131's reference to a second data element 182c (an example of data element 206b in FIG. 2) extracted from the second message 188 to the device 170's reference to the second data element 182c.

In cases where the second message 188 indicates that the first message 186 is not accepted, method 300 may return to operation 322. For example, the first message 186 may be revised by an operator associated with the carrier 151, and the carrier entity device 150 may communicate a revised message 186 to the factor entity device 140 at operation 322 in a feedback loop. This feedback loop may repeat until it is determined that the second message 188 indicates that the first message 186 is accepted at operation 332.

At operation 336, the data transformation device 170 adds the third set of data elements 182c to the mapped dataset 184. Referring back to FIG. 2, at operation 336, after the freight broker 131 communicates the second message 188 to the data transformation device 170 via the freight broker device 130 and integrated application 139, the data transformation device 170 may extract the third set of data elements 182c from the second message 188 and associate each data element 182c to a respective data element (derived from the trusted dataset 162, and/or the historical information 190 which now includes the load data 180 and the first message 186), and include this information in the mapped dataset 184. Referring back to FIG. 3, at operation 338, the data transformation device 170 communicates the second message 188 to the freight broker 131 (see also FIG. 2).

Figure 4:
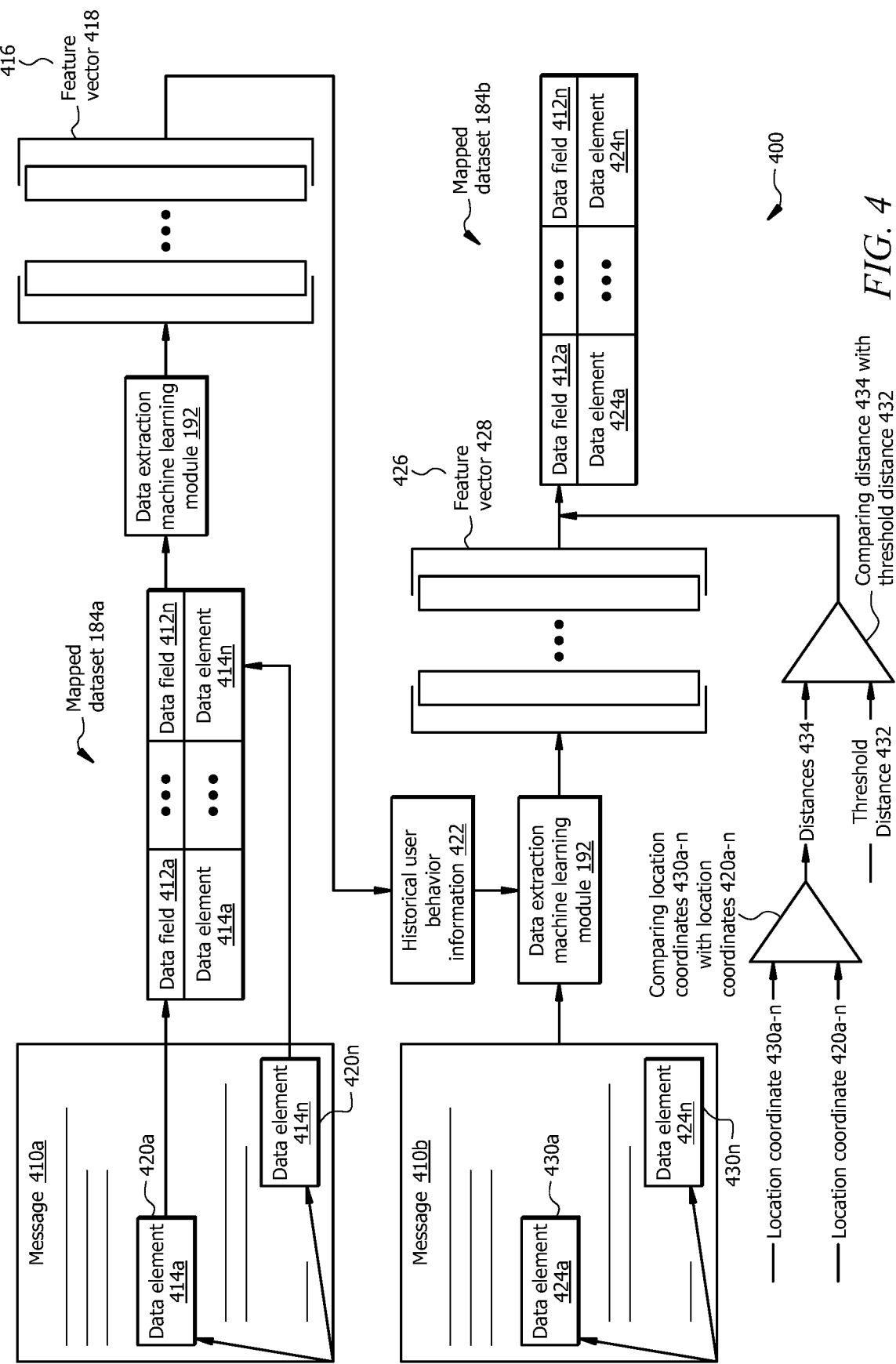
FIG. 4 illustrates an example operational flow of the system of FIG. 1 for data selection and extraction based on historical user behavior.

Operational Flow for Data Selection and Extraction Based on Historical User Behavior FIG. 4 illustrates an example operational flow 400 of system 100 of FIG. 1 for data selection and extraction based on historical user behavior. In some embodiments, the data mapping operations described in FIGS. 1-3 may be performed using a supervised or semi-supervised machine learning technique. For example, the data transformation device 170 may implement the data extraction machine learning module 192 to perform the data mapping operations described in FIGS. 1-3.

The data extraction machine learning module 192 may be trained by a training dataset (e.g., historical user behavior information 422) that may include sample data mappings performed by users. The data extraction machine learning module 192 may use the sample data mappings performed by users as the training dataset to determine and learn what data elements 414a-n from messages 410a-b should be mapped to which data fields 412a-n.

Performing the Data Element Mapping on a Training Message

The operational flow 400 shows an example operation for the data transformation device 170 (e.g., via data extraction machine learning module 192) learning from sample data mappings performed by a user manually mapping data elements 414a-n to respective data fields 412a-n to generate a mapped dataset 184a for a training message 410a. For example, the message 410a may be any of load data 180, message 186, message 188, data packet 204 described in FIGS. 1-3. The message 410a may be in form of an email, a document, a data object table, an image, and the like, for example.

The operational flow 400 may begin when the data transformation device 170 determines and observes the data element mapping performed by the user on the training message 410a. For example, the data transformation device 170 may determine that the first data element 414a is linked to the first data field 412a of the mapped dataset 184a, and the n-th data element 414n is linked to the n-th data field 412n of the mapped dataset 184a. Similarly, the data transformation device 170 may determine that other data elements 414 are linked to their respective data fields 412 of the mapped dataset 184a.

Each data element 414a-n may be any data element included in the mapped dataset 184 described in FIGS. 1-3.

For example, each data element 414*a-n* may be any indicator of the freight broker 131, load 202, carrier 151, factor entity 141, the load, any data element from among data elements 182*a*, any data element from among data elements 182*b*, any data element from among data elements 182*c*, any other data related to transportation of freight, or any other information related to other technologies. The first mapped dataset 184*a* may be an instance of the mapped dataset 184 described in FIGS. 1-3. In the mapped dataset 184*a*, each data field 412*a-n* may be a designated field for a particular data element 414*a-n*. For example, the data field 412*a* may be a designated field for an indicator of the load 202 (see FIG. 2), and data field 412*n* may be a designated field for an indicator of the carrier 151.

In certain embodiments, the data transformation device 170 may determine that the first data element 414*a* is linked to the first data field 412*a* of the mapped dataset 184*a* in response to determining that the user, using a user interface (e.g., a mousepad or touchpad) associated with a user device (e.g., the device 170), dragged the first data element 414*a* and linked the first data element 414*a* to the first data field 412*a* of the mapped dataset 184*a*. Similarly, the data transformation device 170 may determine that each of other data elements 414 is linked to a respective data field 412 of the mapped dataset 184*a* in response to determining that the user, using a user interface (e.g., a mousepad or a touchpad) associated with a user device (e.g., the device 170), dragged each data element 414 and linked the data element 414 to the respective data field 412 of the mapped dataset 184*a*.

In certain embodiments, the data transformation device 170 may determine that the first data element 414*a* is linked to the first data field 412*a* of the mapped dataset 184*a* in response to determining that the user, using a user interface (e.g., a mousepad or touchpad) associated with a user device (e.g., the device 170), input the first data element 414*a* in the first data field 412*a*, e.g., by typing the first data element 414*a* in the first data field 412*a*. The data transformation device 170 may determine that other data elements 414 are linked to their respective data fields 412 in a similar manner.

In certain embodiments, the data transformation device 170 may determine the data element mapping of the message 410*a* based on implementing the data extraction machine learning module 192 which includes an image and/or data object processing algorithm. For example, the data transformation device 170 may feed the message 410*a* (e.g., an image of the message 410*a* and/or a document that includes the message 410*a*) to the data extraction machine learning module 192. The data transformation device 170 may also feed the mapped dataset 184*a* to the data extraction machine learning module 192.

The data extraction machine learning module 192 may extract a set of features 416 from the first message 410*a* by implementing a neural network. For example, the set of features 416 may indicate written text, numbers, characters, shapes, etc. at respective location coordinates 420*a-n* within the first message 410*a*. The location coordinates 420*a-n* may be pixel location coordinates, for example. The set of features 416 may be represented by numerical values in a feature vector 418. The data transformation device 170 may learn the association and relationship between each data element 414*a-n*, its respective data field 412*a-n*, and its respective location coordinate 420*a-n* based on analyzing the extracted features 416 and the mapped dataset 184*a*. In response, the data transformation device 170 may determine that each data element 414*a-n* is located at a respective location coordinate 420*a-n* and is mapped to a respective data field 412*a-n*. For example, the data transformation device 170 may determine that the data element 414*a* is located at the location coordinate 420*a* and is mapped to the data field 412*a*, and data element 414*n* is located at the location coordinate 420*n* and is mapped to the data field 412*n*. The data transformation device 170 may include this information in the historical user behavior information 422. The data transformation device 170 may use the historical user behavior information 422 as the training dataset to predict and perform automatic data element mapping in any message 410.

In certain embodiments, the data transformation device 170 may determine the data element mapping of the message 410*a* based on data object processing. In this process, the data transformation device 170 may implement object-oriented programming and treat each data element 414*a-n* included in the message 410*a* as a data object. In response, the data transformation device 170 may determine to which data field 412*a-n* each data object is mapped, e.g., by comparing the text of each data object extracted from the message 410*a* with the text of data element 414 that is mapped or associated to each data field 412*a-n*. The data transformation device 170 may include this information in the historical user behavior information 422. The data transformation device 170 may use the historical user behavior information 422 as the training dataset to predict and perform automatic data element mapping in any message 410.

Performing the Data Mapping for a Testing Message

In the testing stage, assume that the data transformation device 170 is given the testing message 410*b* and asked to perform the data mapping and generate the mapped dataset 184*b*. The testing message 410*b* may be any of load data 180, message 186, message 188, data packet 204 described in FIGS. 1-3. The message 410*b* may be in form of an email, a document, a data object table, an image, and the like, for example. The mapped dataset 184*b* may be an instance of the mapped dataset 184 described in FIGS. 1-3. For example, during a testing stage, if the data transformation device 170 determines that the data elements 414*a* has been mapped to the data field 412*a* of mapped datasets 184 multiple times (e.g., more than a threshold number of times, such as three times, five time, etc.) in previous messages 410*a*, the data transformation device 170 predicts that a data element 424*a* that is located substantially at the same location coordinate 430*a* as the data element 414*a* in a test message 410*b*, should be mapped to a corresponding data field 412*a* of the mapped dataset 184*b*.

To start the data mapping, the data transformation device 170 may feed the testing message 410*b* to the data extraction machine learning module 192 to be analyzed. The data transformation device 170 may also feed the historical user behavior information 422 to the data extraction machine learning module 192 to be used as the training dataset. The data extraction machine learning module 422 may extract a set of features 426 from the message 410*b*. The set of features 426 may include written text, numbers, and characters at respective location coordinates within the message 410*b*. For example, the set of features 426 may indicate that the data element 424*a* is located at the location coordinate 430*a*, and the data element 424*n* is located at the location coordinate 430*n*. The output of the data extraction machine learning module 192 may be a feature vector 428 that includes numerical values that represent the set of features 426.

To perform the data element mapping (i.e., determine to which data field 412*a-n* each data element 424*a-n* should be mapped), the data transformation device 170 may compare the location coordinates 430*a-n* of data elements 424*a-n* to the location coordinates 420a-n of data elements 414a-n, and use the mapping between the data elements 414a-n and data fields 412a-n as indicated in the historical user behavior information 422. The location coordinates 430a-n may be pixel location coordinates, for example.

For example, for mapping the data element 424a, the data transformation device 170 may compare the location coordinate 430a of the data element 424a with each of the location coordinates 420a-n. Based on the comparison, the data transformation device 170 may determine a distance 434 between the location coordinate 430a and each of the location coordinates 420a-n. Each distance 434 may be in form of (x, y) vector. Each distance 434 may be determined by performing a vector operation as below. For example, assume that the location coordinate 420a is (x1, y1) vector, where the (x1, y1) vector is measured from an origin point (0, 0) on the left bottom corner of the message 410a. Also, assume that the location coordinate 430a is (x2, y2) vector, where the (x2, y2) vector is measured from an origin point (0, 0) on a left bottom corner of the message 410b. The distance 434 between the location coordinate 430a and location coordinate 420a may be determined by calculating |(x1, y1)−(x2, y2)|. In certain embodiments, the distance 434 between the location coordinate 420a-n and the location coordinate 430a-n may be the Euclidian distance. If the Euclidian distance between two vectors representing location coordinates 420a-n, and 430a-n is less than a threshold distance 432, it may be determined that the location coordinate 420a-n and location coordinate 430a-n correspond to each other or are substantially the same. The data transformation device 170 may determine a distance 434 between each location coordinate 430a-n and each location coordinate 420a-n in a similar manner. In certain embodiments, each location coordinate 420a-n. 430a-n may be represented by a vector from an origin point on the left bottom corner of messages 410a-b. In certain embodiments, the distance 434 may be determined when messages 410a-b are superimposed on each other and their origin points are aligned.

With respect to the mapping of the data element 424a, if the data transformation device 170 determines that the distance 434 between the location coordinate 430a with a particular location coordinate 420 is less than a threshold distance 432, the data transformation device 170 may determine that data element 424a with the location coordinate 430a should be mapped to the respective data field 412 that the particular data element 414 is mapped to and is associated with the particular location coordinate 420. The threshold distance 432 may be in the order of pixels length of pixels showing the message 410a-b (e.g., one pixel, two pixels, etc.) or one or more millimeters (e.g., one millimeter, two millimeters, etc.).

In the illustrated example, the data transformation device 170 determines that the difference distance 434 between the location coordinate 430a and the location coordinate 420a is less than the threshold distance 432. In response, the data transformation device 170 associates the data element 424a to the respective data field 412a in the mapped dataset 184b, because the data element 414a is previously mapped to the corresponding data field 412a in the mapped dataset 184a based on the historical user behavior information 422. The data transformation device 170 may perform a similar operation and associate the data element 424n to the data field 412n in the mapped dataset 184b.

In certain embodiments, the data transformation device 170 may determine that the data element 424a corresponds to the data element 414a if it is determined that the distance 434 between the location coordinate 420a and the location coordinate 430a is less than the threshold distance 432. Similarly, the data transformation device 170 may determine that the data element 424n corresponds to the data element 414n if it is determined that the distance 434 between the location coordinate 420n and the location coordinate 430n is less than the threshold distance 432. In this manner, the data transformation device 170 may perform automatic data element mapping for any message and generate mapped datasets 184, including those described in FIGS. 1-3.

The data transformation device 170 may be trained, tested, and refined by using the historical user behavior information 422, previously generated mapped datasets 184, and user feedback on the data mapping results. For example, weight and bias values of neural networks of the data extraction machine learning module 192 may be updated in back propagation operations to increase the accuracy of data element mapping operations.

Method for Data Selection and Extraction Based on Historical User Behavior

Figure 5:
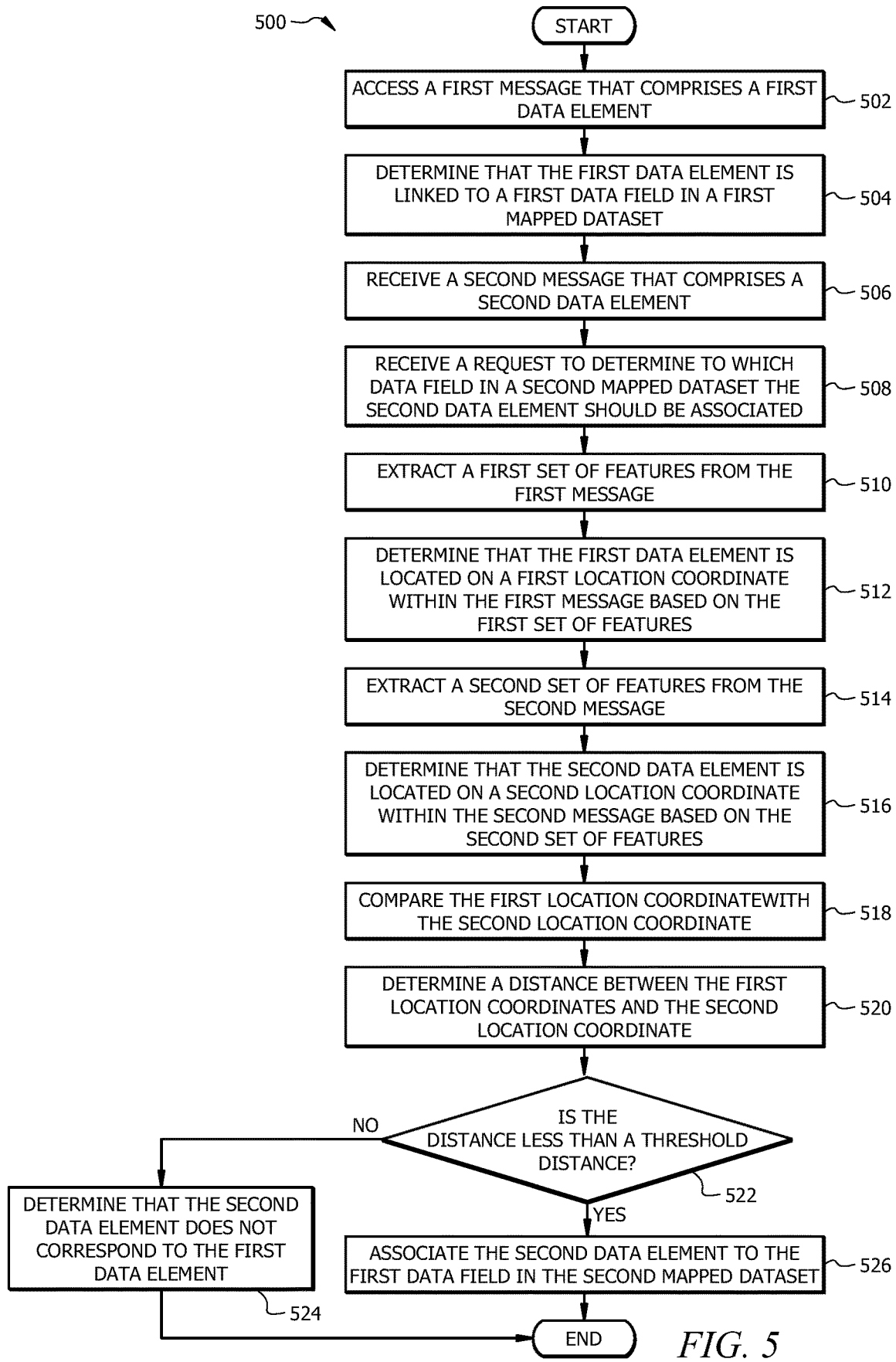
FIG. 5 illustrates an example flowchart of a method for data selection and extraction based on historical user behavior.

FIG. 5 illustrates an example method 500 of system 100 of FIG. 1 for data selection and extraction based on historical user behavior. Modifications, additions, or omissions may be made to method 500. Method 500 may include more, fewer, or other operations. For example, operations may be performed in parallel or in any suitable order. While at times discussed as the system 100, data transformation device 170, or components of any of thereof performing operations, any suitable system or components of the system may perform one or more operations of the method 500. For example, one or more operations of method 500 may be implemented, at least in part, in the form of software instructions 178 of FIG. 1, stored on non-transitory, tangible, machine-readable media (e.g., memory 176 of FIG. 1) that when run by one or more processors (e.g., processor 172 of FIG. 1) may cause the one or more processors to perform operations 502-526.

At operation 502, the data transformation device 170 accesses the first message 410a which comprises the first data element 414a. For example, the data transformation device 170 may access the first message 410a when a user performs a manual data mapping for the first message 410a on the data transformation device 170.

At operation 504, the data transformation device 170 determines that the first data element 414a is linked to the first data field 412a in the first mapped dataset 184a. For example, the data transformation device 170 may determine that first data element 414a in linked to the first data field 412a by feeding the message 410a and mapped dataset 184a to the data extraction machine learning module 192, similar to that described in FIG. 4.

At operation 506, the data transformation device 170 receives the second message 410b which comprises the second data element 424a. The data transformation device 170 may be given the second message 410b to extract data elements 424a-n and associate each data element 424a-n to the respective data field 412a-n, similar to that described in FIG. 4. At operation 508, the data transformation device 170 receives a request to determine to which data field 412a-n in the second mapped dataset 184b the second data element 424a should be associated.

At operation 510, the data transformation device 170 extracts the first set of features 416 from the first message 410a. In this process, the data transformation device 170 may feed the first message 410a to the data extraction machine learning module 192 to extract the first set of features 416, similar to that described in FIG. 4.

At operation 512, the data transformation device 170 determines that the first data element 414a is located on a first location coordinate 420a within the first message 410a based on the first set of features 416.

At operation 514, the data transformation device 170 extracts a second set of features 426 from the second message 410b. In this process, the data transformation device 170 may feed the second message 410b to the data extraction machine learning module 192 to extract the second set of features 416, similar to that described in FIG. 4.

At operation 516, the data transformation device 170 determines that the second data element 424a is located on a second location coordinate 430a within the second message 410b based on the second set of features 426, e.g., via the data extraction machine learning module 192, similar to that described in FIG. 4.

At operation 518, the data transformation device 170 compares the first location coordinate 420a with the location coordinate 430a. For example, the data transformation device 170 may perform a vector comparison, such as Euclidian distance determination, similar to that described in FIG. 4. At operation 520, the data transformation device 170 determines a distance 434 between the first location coordinate 420a and the second location coordinate 430a, similar to that described in FIG. 4.

At operation 522, the data transformation device 170 determines whether the distance 434 is less than the threshold distance 432. If it is determined that the distance is less than the threshold distance 432, method 500 proceeds to operation 526. Otherwise, method 500 proceeds to operation 524.

At operation 524, the data transformation device 170 determines that the second data element 424a does not correspond to the first data element 414a. For example, assuming that the first data element 414a is a name of a particular entity 102, at operation 526, the data transformation device 170 determines that the second data element 424a is not the name of the particular entity 102.

At operation 526, the data transformation device 170 associates the second data element 424a to the first data field 412a in the second mapped dataset 184b. In other words, the data transformation device 170 determines that the second data element 424a corresponds to the first data element 414a. For example, assuming that the first data element 414a is a name of a particular entity 102 as indicated in the first message 410a, at operation 528, the data transformation device 170 determines that the second data element 424a is the name of the particular entity 102 as indicated in the second message 410b. Similar to the mapped dataset 184a, in the mapped dataset 184b, each data field 412a-n may be a designated field for a particular data element 424a-n. For example, assume that the data element 414a is a name of a particular entity 102 (see FIG. 1) indicated in the first message 410a. In this example, the data field 412a in the mapped dataset 184a is designated for the name of the particular entity 102 (see FIG. 1). In another example, assume that the data element 424a is a name of a particular entity 102 (see FIG. 1) indicated in the second message 410b. In this example, the data field 412a in the mapped dataset 184b is designated for the name of the particular entity 102 (see FIG. 1). The data transformation device 170 may perform similar operations as method 500 for mapping other data elements 424, similar to that described in FIG. 4.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for data mapping and transformation, comprising:
a memory configured to store a trusted dataset associated with a first broker and a first carrier, wherein:
the trusted dataset associated with the first broker comprises at least one of a first name, a first identifying number, a first address, or a first phone number with respect to the first broker; and
the trusted dataset associated with the first carrier comprises at least one of a second name, a second identifying number, a second address, or a second phone number with respect to the first carrier; and
a processor operably coupled with the memory, and configured to:
receive load data from a second broker, wherein:
the load data indicates that a load is assigned to a second carrier to be transported;
the load is associated with a shipper; and
the second carrier is associated with a factor entity that facilitates keeping records of documents for the second carrier;
extract a first set of data elements from the load data, wherein the first set of data elements comprises indications of at least one of the second broker, the factor entity, the shipper, or the second carrier, wherein extracting the first set of data elements is in response to implementing a machine learning algorithm that is trained to map a given data element in the load data to a corresponding data field in the trusted dataset based at least in part upon a historical data mapping;
determine that a portion of the first set of data elements is anomalous indicating that the portion of the first set of data elements comprises incomplete or incorrect information about the at least one of the second broker, the factor entity, the shipper, or the second carrier, wherein determining that the portion of the first set of data elements is anomalous comprises determining that the portion of the first set of data element does not correspond to a respective data element in the trusted dataset as determined by the machine learning algorithm;

transform the portion of the first set of data elements that is determined to be anomalous to correct information retrieved from the trusted dataset;

generate a mapped dataset by mapping at least one of the first set of data elements to a respective data element from the trusted dataset; and determine, based at least in part upon mapping of the at least one of the first set of data elements to the respective data element from the trusted dataset, an identity of at least one of the second broker, the factor entity, the shipper, the second carrier.

2. The system of claim 1, wherein generating the mapped dataset by mapping at least one of the first set of data elements to the respective data element from the trusted dataset, comprises:

for the second carrier:
  determine that a majority of data elements in the trusted dataset associated with the first carrier corresponds to respective data elements associated with the second carrier;
  determine that the second carrier is the first carrier;
  identify first anomalous data associated with the first carrier in the first set of data elements, wherein the first anomalous data comprises a first incorrect or incomplete information about the first carrier; and
  transform at least a portion of the load data into a first structured data that includes correct information about the second carrier, wherein:
    transforming the at least the portion of the load data into the first structured data comprises replacing the first anomalous data with the correct information about the second carrier; and
    the correct information about the second carrier is retrieved from the trusted dataset.

3. The system of claim 1, wherein generating the mapped dataset by mapping at least one of the first set of data elements to the respective data element from the trusted dataset, comprises:

for the second broker:
  determine that a majority of data elements in the trusted dataset associated with the first broker corresponds to respective data elements associated with the second broker;
  determine that the second broker is the first broker;
  identify second anomalous data associated with the first broker in the first set of data elements, wherein the second anomalous data comprises a second incorrect or incomplete information about the first broker; and
  transform at least a portion of the load data into a second structured data that includes correct information about the second broker, wherein:
    transforming the at least the portion of the load data into the second structured data comprises replacing the second anomalous data with the correct information about the second broker; and
    the correct information about the second carrier is retrieved from the trusted dataset.

4. The system of claim 1, wherein the processor is further configured to:

before communicating the load data to the factor entity:
  identify, based at least in part upon historical information received from the factor entity; a first reference of the second carrier used by the factor entity; and
  transform a second reference of the second carrier used by the second broker in the load data into the first reference of the second carrier, wherein transforming the second reference of the second carrier used by the second broker in the load data into the first reference of the second carrier comprises replacing the second reference of the second carrier with the first reference of the second carrier in the load data.

5. The system of claim 1, wherein the processor is further configured to:

before communicating the load data to the factor entity:
  identify, based at least in part upon historical information received from the factor entity; a third reference of the shipper used by the factor entity; and
  transform a fourth reference of the shipper used by the second broker in the load data into the third reference of the shipper, wherein transforming the third reference of the shipper into the fourth reference of the shipper comprises replacing the third reference of the shipper with the fourth reference of the shipper in the load data.

6. The system of claim 1, wherein the processor is further configured to:

based at least in part upon the determined identity of the factor entity, communicate the load data to the factor entity;
receive, from the factor entity, a first message comprising information about a completion of transportation of the load;
extract a second set of data elements from the first message, wherein the second set of data elements comprises the information about the completion of transportation of the load;
add the second set of data elements to the mapped dataset;
communicate the first message to the second broker;
receive, from the second broker, a second message comprising a status of the first message, wherein the status of the first message indicates whether the first message is acceptable;
extract a third set of data elements comprising the status of the first message from the second message; and
add the third set of data elements to the mapped dataset.

7. The system of claim 6, wherein the processor is further configured to:

before communicating the first message to the second broker:
  identify, based at least in part upon historical information received from the second broker; a fifth reference of the shipper used by the second broker; and
  transform a sixth reference of the shipper used by the factor entity in the first message into the fifth reference of the shipper, wherein transforming the fifth reference of the shipper into the sixth reference of the shipper comprises replacing the sixth reference of the shipper with the fifth reference of the shipper in the first message.

8. A method for data mapping and transformation, comprising:

storing a trusted dataset associated with a first broker and a first carrier, wherein:
  the trusted dataset associated with the first broker comprises at least one of a first name, a first identifying number, a first address, or a first phone number with respect to the first broker; and
  the trusted dataset associated with the first carrier comprises at least one of a second name, a second identifying number, a second address, or a second phone number with respect to the first carrier;
receiving load data from a second broker, wherein:
  the load data indicates that a load is assigned to a second carrier to be transported;

the load is associated with a shipper; and
the second carrier is associated with a factor entity that facilitates keeping records of documents for the second carrier;
extracting a first set of data elements from the load data, wherein the first set of data elements comprises indications of at least one of the second broker, the factor entity, the shipper, or the second carrier, wherein extracting the first set of data elements is in response to implementing a machine learning algorithm that is trained to map a given data element in the load data to a corresponding data field in the trusted dataset based at least in part upon a historical data mapping;
determining that a portion of the first set of data elements is anomalous indicating that the portion of the first set of data elements comprises incomplete or incorrect information about the at least one of the second broker, the factor entity, the shipper, or the second carrier, wherein determining that the portion of the first set of data elements is anomalous comprises determining that the portion of the first set of data element does not correspond to a respective data element in the trusted dataset as determined by the machine learning algorithm;
transforming the portion of the first set of data elements that is determined to be anomalous to correct information retrieved from the trusted dataset;
generating a mapped dataset by mapping at least one of the first set of data elements to a respective data element from the trusted dataset; and
determining, based at least in part upon mapping of the at least one of the first set of data elements to the respective data element from the trusted dataset, an identity of at least one of the second broker, the factor entity, the shipper, the second carrier.

9. The method of claim 8, wherein generating the mapped dataset by mapping at least one of the first set of data elements to the respective data element from the trusted dataset, comprises:
for the second carrier:
determining that a majority of data elements in the trusted dataset associated with the first carrier corresponds to respective data elements associated with the second carrier;
determining that the second carrier is the first carrier;
identifying first anomalous data associated with the first carrier in the first set of data elements, wherein the first anomalous data comprises a first incorrect or incomplete information about the first carrier; and
transforming at least a portion of the load data into a first structured data that includes correct information about the second carrier, wherein:
transforming the at least the portion of the load data into the first structured data comprises replacing the first anomalous data with the correct information about the second carrier; and
the correct information about the second carrier is retrieved from the trusted dataset.

10. The method of claim 8, wherein generating the mapped dataset by mapping at least one of the first set of data elements to the respective data element from the trusted dataset, comprises:
for the second broker:
determining that a majority of data elements in the trusted dataset associated with the first broker corresponds to respective data elements associated with the second broker;
determining that the second broker is the first broker;
identifying second anomalous data associated with the first broker in the first set of data elements, wherein the second anomalous data comprises a second incorrect or incomplete information about the first broker; and
transforming at least a portion of the load data into a second structured data that includes correct information about the second broker, wherein:
transforming the at least the portion of the load data into the second structured data comprises replacing the second anomalous data with the correct information about the second broker; and
the correct information about the second carrier is retrieved from the trusted dataset.

11. The method of claim 8, further comprising:
before communicating the load data to the factor entity:
identifying, based at least in part upon historical information received from the factor entity; a first reference of the second carrier used by the factor entity; and
transforming a second reference of the second carrier used by the second broker in the load data into the first reference of the second carrier, wherein transforming the second reference of the second carrier used by the second broker in the load data into the first reference of the second carrier comprises replacing the second reference of the second carrier with the first reference of the second carrier in the load data.

12. The method of claim 8, further comprising:
before communicating the load data to the factor entity:
identifying, based at least in part upon historical information received from the factor entity; a third reference of the shipper used by the factor entity; and
transforming a fourth reference of the shipper used by the second broker in the load data into the third reference of the shipper, wherein transforming the third reference of the shipper into the fourth reference of the shipper comprises replacing the third reference of the shipper with the fourth reference of the shipper in the load data.

13. The method of claim 8, further comprising:
based at least in part upon the determined identity of the factor entity, communicating the load data to the factor entity;
receiving, from the factor entity, a first message comprising information about a completion of transportation of the load;
extracting a second set of data elements from the first message, wherein the second set of data elements comprises the information about the completion of transportation of the load;
adding the second set of data elements to the mapped dataset;
communicating the first message to the second broker;
receive, from the second broker, a second message comprising a status of the first message, wherein the status of the first message indicates whether the first message is acceptable;
extracting a third set of data elements comprising the status of the first message from the second message; and
adding the third set of data elements to the mapped dataset.

14. The method of claim 13, further comprising:
before communicating the first message to the second broker:
identifying, based at least in part upon historical information received from the second broker; a fifth reference of the shipper used by the second broker; and
transforming a sixth reference of the shipper used by the factor entity in the first message into the fifth reference of the shipper, wherein transforming the fifth reference of the shipper into the sixth reference of the shipper comprises replacing the sixth reference of the shipper with the fifth reference of the shipper in the first message.

15. A non-transitory computer-readable medium storing instructions that when executed by a processor, cause the processor to:
store a trusted dataset associated with a first freight broker and a first carrier, wherein:
the trusted dataset associated with the first freight broker comprises at least one of a first name, a first identifying number, a first address, and a first phone number with respect to the first freight broker; and
the trusted dataset associated with the first carrier comprises at least one of a second name, a second identifying number, a second address, and a second phone number with respect to the first carrier;
receive load data from a second broker, wherein:
the load data indicates that a load is assigned to a second carrier to be transported;
the load is associated with a shipper; and
the second carrier is associated with a factor entity that facilitates keeping records of documents for the second carrier;
extract a first set of data elements from the load data, wherein the first set of data elements comprises indications of at least one of the second broker, the factor entity, the shipper, or the second carrier, wherein extracting the first set of data elements is in response to implementing a machine learning algorithm that is trained to map a given data element in the load data to a corresponding data field in the trusted dataset based at least in part upon a historical data mapping;
determine that a portion of the first set of data elements is anomalous indicating that the portion of the first set of data elements comprises incomplete or incorrect information about the at least one of the second broker, the factor entity, the shipper, the second carrier;
transform the portion of the first set of data elements that is determined to be anomalous to correct information retrieved from the trusted dataset;
generate a mapped dataset by mapping at least one of the first set of data elements to a respective data element from the trusted dataset; and
determine, based at least in part upon mapping of the at least one of the first set of data elements to the respective data element from the trusted dataset, an identity of at least one of the second broker, the factor entity, the shipper, or the second carrier, wherein determining that the portion of the first set of data elements is anomalous comprises determining that the portion of the first set of data element does not correspond to a respective data element in the trusted dataset as determined by the machine learning algorithm.

16. The non-transitory computer-readable medium of claim 15, wherein generating the mapped dataset by mapping at least one of the first set of data elements to the respective data element from the trusted dataset, comprises:
for the second carrier:
determine that a majority of data elements in the trusted dataset associated with the first carrier corresponds to respective data elements associated with the second carrier;
determine that the second carrier is the first carrier;
identify first anomalous data associated with the first carrier in the first set of data elements, wherein the first anomalous data comprises a first incorrect or incomplete information about the first carrier; and
transform at least a portion of the load data into a first structured data that includes correct information about the second carrier, wherein:
transforming the at least the portion of the load data into the first structured data comprises replacing the first anomalous data with the correct information about the second carrier; and
the correct information about the second carrier is retrieved from the trusted dataset.

17. The non-transitory computer-readable medium of claim 15, wherein generating the mapped dataset by mapping at least one of the first set of data elements to the respective data element from the trusted dataset, comprises:
for the second broker:
determine that a majority of data elements in the trusted dataset associated with the first broker corresponds to respective data elements associated with the second broker;
determine that the second broker is the first broker;
identify second anomalous data associated with the first broker in the first set of data elements, wherein the second anomalous data comprises a second incorrect or incomplete information about the first broker; and
transform at least a portion of the load data into a second structured data that includes correct information about the second broker, wherein:
transforming the at least the portion of the load data into the second structured data comprises replacing the second anomalous data with the correct information about the second broker; and
the correct information about the second carrier is retrieved from the trusted dataset.

18. The non-transitory computer-readable medium of claim 15, wherein the instructions further cause the processor to:
before communicating the load data to the factor entity:
identify, based at least in part upon historical information received from the factor entity; a first reference of the second carrier used by the factor entity; and
transform a second reference of the second carrier used by the second broker in the load data into the first reference of the second carrier, wherein transforming the second reference of the second carrier used by the second broker in the load data into the first reference of the second carrier comprises replacing the second reference of the second carrier with the first reference of the second carrier in the load data.

19. The non-transitory computer-readable medium of claim 15, wherein the instructions further cause the processor to:
before communicating the load data to the factor entity:
identify, based at least in part upon historical information received from the factor entity; a third reference of the shipper used by the factor entity; and transform a fourth reference of the shipper used by the second broker in the load data into the third reference of the shipper, wherein transforming the third reference of the shipper into the fourth reference of the shipper comprises replacing the third reference of the shipper with the fourth reference of the shipper in the load data.

20. The non-transitory computer-readable medium of claim 15, wherein the processor is further configured to:

based at least in part upon the determined identity of the factor entity, communicate the load data to the factor entity;

receive, from the factor entity, a first message comprising information about a completion of transportation of the load;

extract a second set of data elements from the first message, wherein the second set of data elements comprises the information about the completion of transportation of the load;

add the second set of data elements to the mapped dataset;

communicate the first message to the second broker;

receive, from the second broker, a second message comprising a status of the first message, wherein the status of the first message indicates whether the first message is acceptable;

extract a third set of data elements comprising the status of the first message from the second message; and add the third set of data elements to the mapped dataset.

* * * * *